United States Patent
Choi et al.

(10) Patent No.: US 9,713,086 B2
(45) Date of Patent: Jul. 18, 2017

(54) METHOD FOR CONTROLLING POWER OF RRH IN CLOUD RAN ENVIRONMENT

(71) Applicant: LG ELECTRONICS INC., Seoul (KR)

(72) Inventors: Hyeyoung Choi, Seoul (KR); Heejeong Cho, Seoul (KR); Jaehoon Chung, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/022,178

(22) PCT Filed: Oct. 6, 2014

(86) PCT No.: PCT/KR2014/009375
§ 371 (c)(1),
(2) Date: Mar. 15, 2016

(87) PCT Pub. No.: WO2015/053516
PCT Pub. Date: Apr. 16, 2015

(65) Prior Publication Data
US 2016/0234773 A1 Aug. 11, 2016

Related U.S. Application Data

(60) Provisional application No. 61/889,535, filed on Oct. 11, 2013.

(51) Int. Cl.
*H04W 52/02* (2009.01)
*H04W 88/08* (2009.01)

(52) U.S. Cl.
CPC ...... *H04W 52/0206* (2013.01); *H04W 88/085* (2013.01); *Y02B 60/50* (2013.01)

(58) Field of Classification Search
CPC .................. H04W 52/0206; H04W 88/085
(Continued)

(56) References Cited

U.S. PATENT DOCUMENTS

2011/0092212 A1* 4/2011 Kubota ............ H04W 52/0225
455/436
2012/0087247 A1 4/2012 Min et al.
(Continued)

FOREIGN PATENT DOCUMENTS

EP 2141947 A1 1/2010
EP 2592863 A1 5/2013
(Continued)

*Primary Examiner* — Cong Tran
(74) *Attorney, Agent, or Firm* — Birch, Stewart, Kolasch & Birch, LLP

(57) ABSTRACT

Disclosed are: a power control method for receiving a measurement report message with respect to an RRH from a terminal, transmitting RAT information to the terminal, receiving a wake-up request message and setting a power state of the RRH to switch-on; and a power control method for determining switch-off of the RRH on the basis of the measurement report message from the terminal, transmitting an RRH state change request message to BBUs, transmitting an RRH state change command message, switching the RRH and setting the power state of the RRH to switch-off, in a cloud RAN environment in which the RRH and the BBUs are separated.

15 Claims, 14 Drawing Sheets

(58) Field of Classification Search
USPC .......... 455/436–439, 444, 419, 67.11, 115.1,
455/226.1, 226.2; 370/331–332, 329
See application file for complete search history.

(56) References Cited

U.S. PATENT DOCUMENTS

| | | | |
|---|---|---|---|
| 2013/0012189 A1* | 1/2013 | Hamabe | H04W 24/10 455/422.1 |
| 2013/0100907 A1* | 4/2013 | Liu | H04L 5/0023 370/329 |
| 2013/0223350 A1 | 8/2013 | Kang et al. | |
| 2013/0235726 A1* | 9/2013 | Frederiksen | H04W 28/0247 370/235 |
| 2013/0258896 A1 | 10/2013 | Park et al. | |
| 2013/0301439 A1* | 11/2013 | Heo | H04W 76/048 370/252 |
| 2014/0003262 A1* | 1/2014 | He | H04W 28/08 370/252 |
| 2016/0037511 A1* | 2/2016 | Vincze | H04B 7/024 370/329 |

FOREIGN PATENT DOCUMENTS

| | | |
|---|---|---|
| KR | 10-2012-0036449 A | 4/2012 |
| KR | 10-2012-0096408 A | 8/2012 |
| KR | 10-2013-0066686 A | 6/2013 |
| KR | 10-2013-0097586 A | 9/2013 |

* cited by examiner

MeNB : macro eNode B
PeNB : pico eNodeB
FeNB : femto eNode B

MUE : macro UE
PUE : pico UE
FUE : femto UE

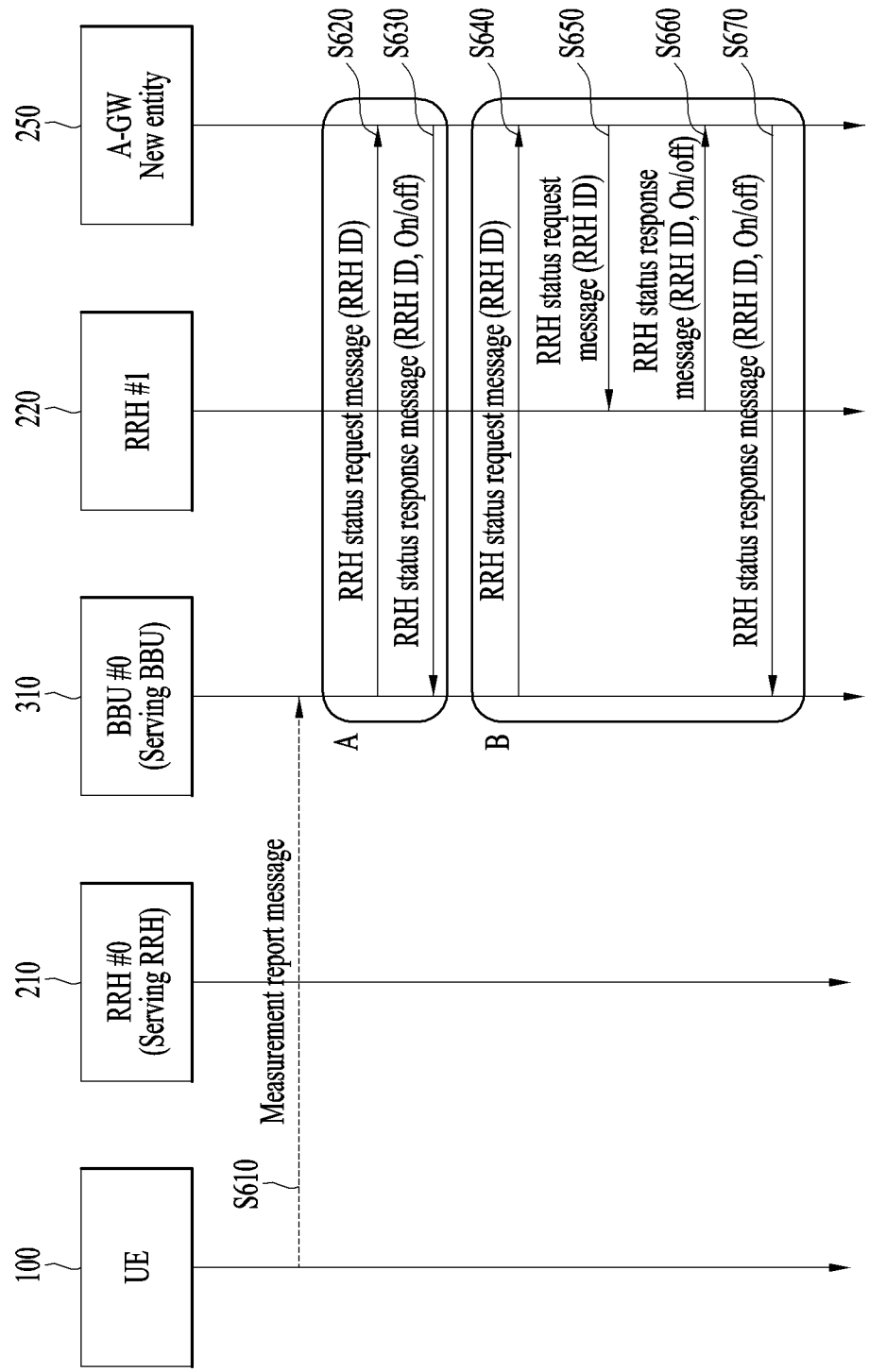

FIG. 7

FIG. 8

Table 5.5-1 E-UTRA operating bands

| E-UTRA Operating Band | Uplink (UL) oprating band BS receive UE transmit $F_{UL\_low} - F_{UL\_high}$ | Downlink (DL) oprating band BS receive UE transmit $F_{DL\_low} - F_{DL\_high}$ | Duplex Mode |
|---|---|---|---|
| 1 | 1920 MHz - 1980 MHz | 2110 MHz - 2170 MHz | FDD |
| 2 | 1850 MHz - 1910 MHz | 1930 MHz - 1990 MHz | FDD |
| 3 | 1710 MHz - 1785 MHz | 1805 MHz - 1880 MHz | FDD |
| ⋮ | ⋮ | ⋮ | |
| 41 | 2496 MHz - 2690 MHz | 2496 MHz - 2690 MHz | TDD |
| 42 | 3400 MHz - 3600 MHz | 3400 MHz - 3600 MHz | TDD |
| 43 | 3600 MHz - 3800 MHz | 3600 MHz - 3800 MHz | TDD |
| 44 | 703 MHz - 803 MHz | 703 MHz - 803 MHz | TDD |

NOTE 1 : Band 6 is not applicable
NOTE 2 : Restricted to E-UTRA operation when carrier aggregation is configured. The downlink operating band is paired with the uplink operating band(external) of the carrier aggregation configuration that is supporting the configured Pcell.

METHOD FOR CONTROLLING POWER OF RRH IN CLOUD RAN ENVIRONMENT

CROSS REFERENCE TO RELATED APPLICATIONS

This application is the National Phase of PCT International Application No. PCT/KR2014/009375, filed on Oct. 6, 2014, which claims priority under 35 U.S.C. 119(e) to U.S. Provisional Application No. 61/889,535, filed on Oct. 11, 2013, all of which are hereby expressly incorporated by reference into the present application.

TECHNICAL FIELD

The present invention relates to a method for controlling power of an RRH in a heterogeneous environment in which a macro cell and a small cell coexist in a technology related to a user equipment thereof.

BACKGROUND ART

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network. An object of a new RAN configuration is to increase QoE (Quality of Experience) by providing a high data transfer rate to an end user.

In a complicated urban environment, it is inefficient to install an additional macro cell base station as in conventional cases. This is because system throughput is not significantly improved compared to increase of cost and complexity for installation of an additional macro cell due to a shadow area of the communication environment. Thereby, in a new heterogeneous cell structure, multiple small cells coexist in a macro cell, and are assigned resources according to a cell coordination scheme to serve UEs. Such heterogeneous cell structure is intended to provide a high data transmission rate for end users to enhance Quality of Experience (QoE).

In small cell enhancements for E-UTRA and E-UTRAN study item (SI) as one of 3rd generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conducted to draw advantages of concept of dual connectivity to small cell layers and a macro cell layer in which a user uses the same or different carriers.

DISCLOSURE

Technical Problem

An object of the present invention devised to solve the problem lies in controlling power of an RRH in a network environment having the RRH separated from a BBU to reduce power consumption.

Another object of the present invention lies in switching on and off power of an RRH according to several references to manage power consumption of the RRH by reflecting dynamic changes occurring in the surroundings.

Another object of the present invention lies in if efficiently managing power of the RRH by allowing various subjects to control the power of the RRH.

Objects of the present invention are not limited to the aforementioned objects, and other objects of the present invention which are not mentioned above will become apparent to those having ordinary skill in the art upon examination of the following description.

Technical Solution

To solve the aforementioned problem, methods for controlling power of an RRH according to a deployment environment of the RRH and a BBU are proposed in the following description. Specifically, proposed herein is a method for a BBU connected to the RRH to switch on or off the RRH according to a measurement report message from a UE.

Advantageous Effects

According to embodiments of the present measure, the following effects may be expected from the present invention.

First, the power that an RRH unnecessarily consumes may be saved through a procedure of switching the RRH on or off.

Second, power consumption of an RRH may be dynamically managed by controlling power of the RRH according to various conditions even if the communication environment changes in various manners.

Third, as various subjects including a BBU, an RRH and an A-GW are allowed to manage power of the RRH, the power management procedure for the RRH may be efficiently performed.

It will be appreciated by persons skilled in the art that that the effects that can be achieved through the embodiments of the present invention are not limited to those described above and other advantages of the present invention will be more clearly understood from the following detailed description. That is, unintended effects according to implementation of the present invention may be derived by persons skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements. In the drawings:

FIG. 6 is a flowchart illustrating a method for checking an RRH status according to an embodiment of the present invention;

FIG. 7 is a flowchart illustrating a method for transmitting RAT information about an RRH according to an embodiment of the present invention;

FIG. 8 is a flowchart illustrating a method for transmitting RAT information about an RRH according to another embodiment of the present invention;

BEST MODE

Figure 1:
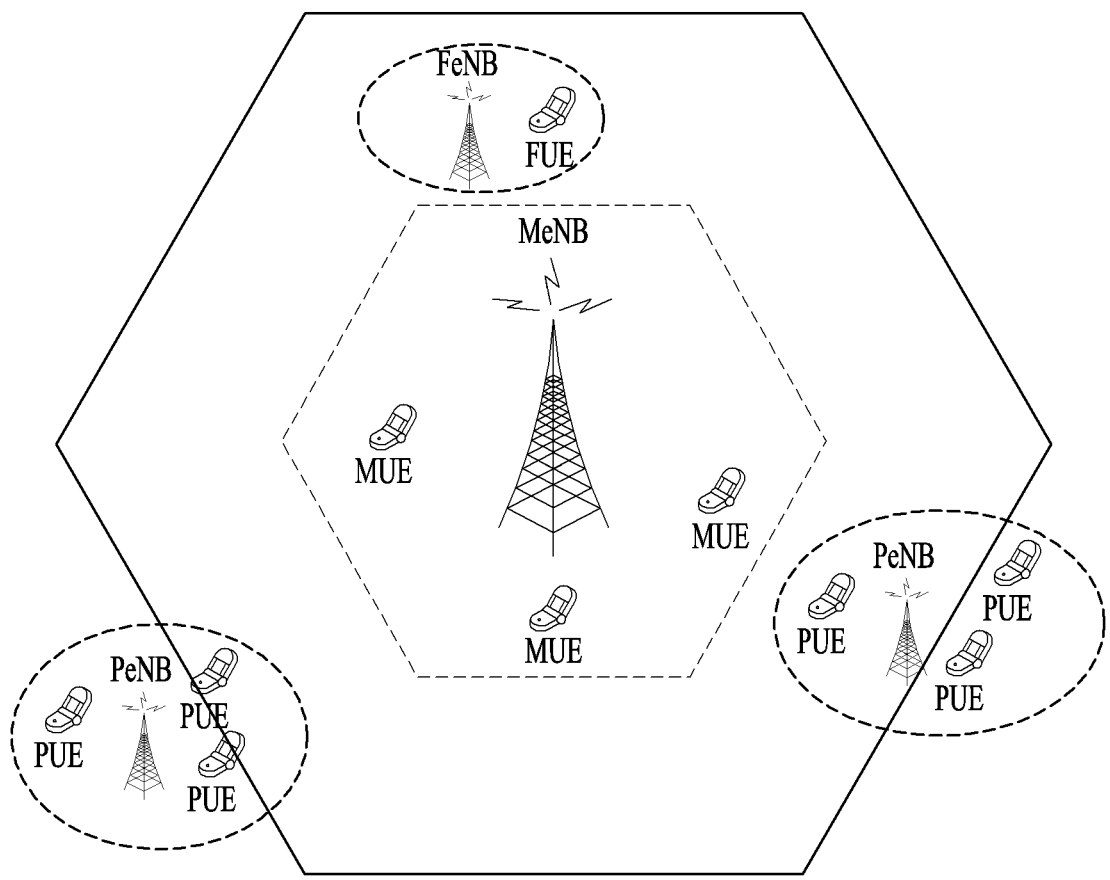
FIG. 1 is a diagram illustrating a heterogeneous network environment related to the present invention.

The object of the present invention can be achieved by providing a method for controlling power of a Remote Radio Head (RRH) by a Base Band Unit (BBU), the method including receiving, from a terminal, a measurement report message for reporting that a measured strength of a downlink (DL) signal of the RRH is greater than or equal to a threshold, transmitting, to the terminal, Radio Access Technology (RAT) information indicating RATs supported by the RRH in response to the measurement report message, receiving, from the terminal, a wake-up request message containing information about an RAT preferred by the terminal among the RATs contained in the RAT information, and setting a power status of the RRH to Switch On based on the wake-up request message.

The RAT information may be acquired from an entity managing information about a mapping relationship between RRHs and BBUs or the RRH.

The method may further include checking the power status of the RRH before transmitting the RAT information to the terminal, wherein the power status may be Switch On or Switch Off, and may be checked from an entity managing information about a mapping relationship between RRHs and BBUs or the RRH.

The RAT information may express information about the RATs or a frequency band supported by the RRH as a bitmap, a combination of preconfigured bits for the respective RATs, or an Absolute Radio Frequency Channel Number (ARFCN) value.

The method may further include acquiring information about a first BBU mapped to the RRH after receiving the wake-up request message, wherein the information about the first BBU may be acquired from an entity managing information about a mapping relationship between RRHs and BBUs.

The method may further include changing, after the acquiring, a mapping relationship between the RRH and the first BBU to a mapping relationship between the RRH and a second BBU supporting the RAT preferred by the terminal.

The changing may include requesting that the entity configure a BBU supporting the RAT preferred by the terminal, requesting that the second BBU establish connection to the RRH, based on a response for designation of the second BBU from the entity, and receiving, from the second BBU, a response message indicating that connection to the RRH has been established.

The changing may include requesting that the entity configure a BBU supporting the RAT preferred by the terminal, and receiving, from the first BBU, a response message indicating that connection between the second BBU and the RRH has been established when a procedure of coordination between the first BBU and the second BBU is completed according to an instruction from the entity.

The changing may include requesting that the entity configure a BBU supporting the RAT preferred by the terminal, and receiving, from the entity, a response message indicating that connection between the second BBU and the RRH has been established when a procedure of coordination between the entity and the second BBU is completed.

The changing may include requesting that the first BBU configure a BBU supporting the RAT preferred by the terminal, and receiving, from the first BBU, a response message indicating that connection between the second BBU and the RRH has been established when a procedure of coordination among the first BBU, the second BBU and the entity is completed according to a request from the first BBU.

The entity managing the information about the mapping relationship may be a server or an access gateway (A-GW).

In another aspect of the present invention, provided herein is a method for controlling power of a Remote Radio Head (RRH) by a Base Band Unit (BBU), the method including determining to set a power status of a first RRH to Switch Off based on a measurement report message about the first RRH received from a terminal, transmitting, to BBUs connected to the first RRH, an RRH status change request message for signaling that the power status of the first RRH should be set to Switch Off, transmitting, when RRH status change response messages for approving the RRH status change request are received from all the BBUs connected to the first RRH, and RRH status change command message for instructing RRH switching to the BBUs, performing, when RRH switching of the BBUs is completed, RRH switching for changing a mapping relationship with the first RRH to a mapping relationship with a second RRH, and setting the power status of the first RRH to Switch Off.

The method may further include stopping, when an RRH status change failure message for rejecting the RRH status change request is received from at least one of the BBUs connected to the first RRH, a procedure of controlling the power of the RRH.

The RRH status change command message may include an indicator for designating one of the BBUs connected to the first RRH as a common BBU, wherein the common BBU may be a BBU connected to the first RRH to perform communication even if the first RRH is switched off.

The performing of the RRH switching may include determining completion of the RRH switching as an RRH status change command Ack message is received from the BBU in response to the RRH status change command message.

The setting may include switching off at least one of a transmission mode and reception mode of the first RRH and switching off a part or entirety of carriers and Radio Access Technologies (RATS) supported by the first RRH.

The determining may include determining the Switch Off using at least one of information about a load condition of the first RRH, information about interference applied to the first RRH and information about interference caused by the first RRH from the measurement report message.

MODE FOR INVENTION

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1 b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Environment

FIG. 1 is a diagram for a heterogeneous network environment associated with one embodiment of the present invention.

To guarantee a more stable data service such as multimedia service in future-generation mobile communication, much attention has been attracted to a hierarchical cell structure or heterogeneous cell structure in which small cells (e.g., pico cells or femto cells) for low power/near field communication are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each of a plurality of the small cells serves corresponding UEs by resource allocation based on a cell coordination scheme. As one of core technologies for implementing the aforementioned heterogeneous network environment, it may be able to separately implement an RRU (remote radio unit) and a BBU (baseband unit).

2. Cloud RAN Environment in which RRU and BBU are Separated from Each Other

Figure 2:
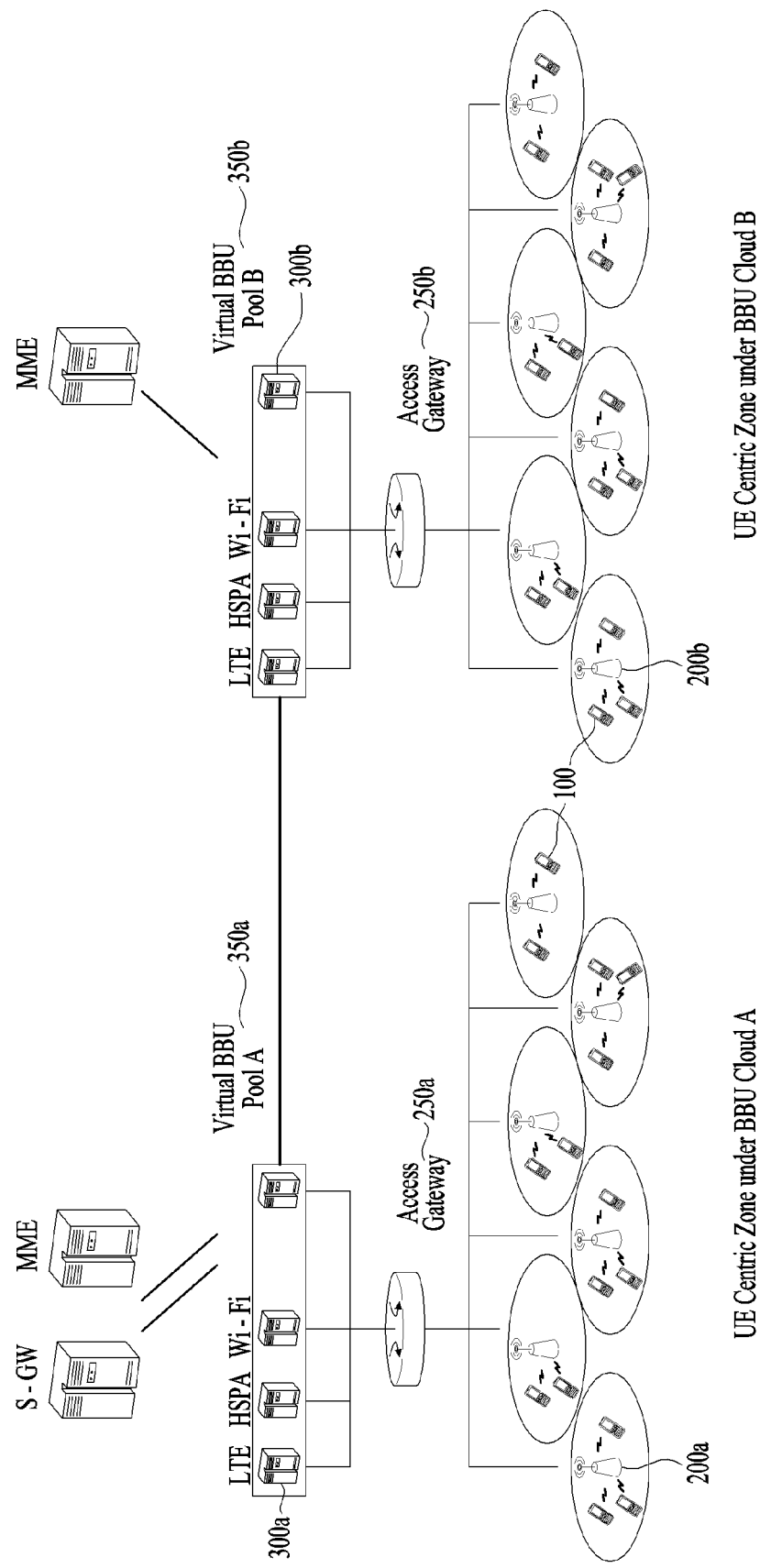
FIG. 2 is a diagram illustrating a cloud RAN environment related to the present invention.

FIG. 2 is a diagram for a cloud RAN (C-RAN) environment associated with one embodiment of the present invention. The cloud RAN environment can consist of a plurality of RRUs 200a/200b, a software-based virtual BBU pool 350a/350b or a virtual base station (VBS) and an access control/resource management/authentication server controlling the same and the like. Since elements of a core network change into an open IP network in the cloud RAN environment, many elements of the cloud RAN are directly interlocked with the elements of the core network in an organic relation.

Meanwhile, as an example of implementing the cloud RAN environment, as mentioned in the foregoing description, there may exist environment in which RRUs 200a/200b and BBUs 300a/300b are separated from each other. According to the separation of the RRUs and the BBUs, it may be able to compose cloud RAN environment including characteristics described in the following.

Firstly, a virtual BBU pool 350a/350b exists and includes a plurality of BBUs 300a/300b. The virtual BBU pool 350a/350b has a structure of being associated with SAS (shared antenna system) RRUs 200a/200b supporting Multi-RAT (multi-radio access technology) through an access gateway 250a/250b. The virtual BBU pool 350a/350b includes a plurality of BBUs 300a/300b supporting various wireless access technologies and one RRU 200a/200b can be associated with one or more BBUs 300a/300b. On the contrary, one BBU 300a/300b can be associated with one or more RRUs 200a/200b. BBUs 300a/300b belonging to the virtual BBU pool 350a/350b can be connected with the RRUs 200a/200b via an ideal/non-ideal backhaul and one virtual BBU pool 350a can be connected with another virtual BBU pool 350b via X2 interface or an interface similar to the X2 interface.

Secondly, all RRUs 200a/200b belonging to the virtual BBU pool 350a/350b have an identical virtual cell ID and all BBUs 300a/300b and all RRUs 200a/200b belonging to the virtual BBU pool 350a/350b are connected with each other via an ideal backhaul. An RRU 200a/200b is controlled by a BBU 300a/300b associated with the RRU.

Thirdly, a synchronization signal used for obtaining downlink synchronization is transmitted by each of the RRUs 200a/200b and the synchronization signal can be transmitted in a manner of including not only a virtual cell ID capable of representing the virtual BBU pool 350a/350b to which the RRUs 200a/200b belong thereto but also an RRU ID capable of representing each of the RRUs 200a/200b.

Fourthly, each of the RRUs 200a/200b assumes a simple antenna and L1/L2/L3 layer processing is processed by the BBUs 300a/300b belonging to the virtual BBU pool 350a/350b. And, the RRUs 200a/200b may have an attribute of SAS and it indicates that the RRUs 200a/200b may belong to another BBU from one BBU in the virtual BBU pool 350a/350b. In particular, time-variable belonging of the RRUs 200a/200b may change from one BBU to another BBU according to a situation (e.g., load of the BBUs, an available resource status, etc.) of the BBUs 300a/300b.

According to a legacy technology, there exists a physical cell and users receive a service by accessing the cell. Yet, as mentioned in the foregoing description, when an RRU and a BBU are implemented in a manner of being separated from each other, a network configures a zone capable of providing optimized communication environment in a user unit and provides a user with a zone-based service.

3. Method for Managing Power of RRH (Switch On)

In the heterogeneous network environment described above, introduction of a method for effectively switching power of a small cell on or off according to situations is required. This is intended to reduce power consumption of the small cell or eliminate interference between small cells. Switching on or off power of a small cell may mean activating/deactivating one of the DL and the UL or activating/deactivating both the DL and the UL.

Hereinafter, a description will be given of a method for switching an RRH forming a small cell on and off according to various embodiments of the present invention. First, as a method for reactivating a switched-off RRH, a power management method based on a DL signal and a power management method based on a UL signal will be described below. The present invention is not limited to the details of embodiments of SAS RRHs described below, but is applicable to a general heterogeneous network environment.

When an RRH mapped to a specific BBU is in the switched-off state, the RRH and may wake up at constant intervals to transmit a DL signal or receive a UL signal. This is because UEs positioned near the switched-off RRH in the network needed to recognize presence of the RRH to change the switched-off RRH to the switched-on state. The switched-off RRH may be mapped to one or more BBUs, and the mapping relationship between the RRH and the BBUs may be RRH-specific. For example, when the switched-off RRH supports Multi Radio Access Technology (multi-RAT), the RRH may be mapped to a multi-RAT BBU. Alternatively, if an RRH supporting both LTE (Long Term Evolution) and Wi-Fi is switched off, the RRH may be connected to a BBU supporting LTE and a BBU supporting Wi-Fi simultaneously.

Hereinafter, a description will be given of a method for switching on a switched-off RRH based on a DL signal with reference to FIGS. 3 to 9. Then, a description will be given of a method for switching on the RRH based on a UL signal with reference to FIG. 10.

Figure 3:
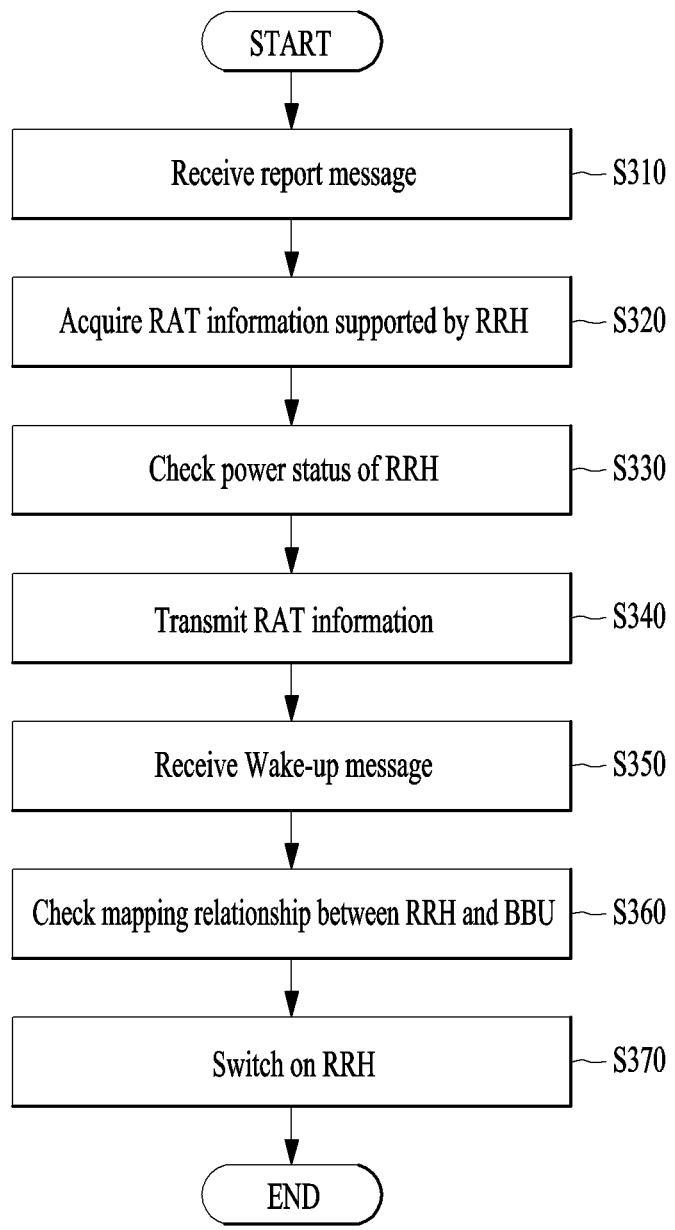
FIG. 3 is a diagram illustrating a method for controlling power of an RRH according to an embodiment of the present invention.

FIG. 3 is a diagram illustrating a method for controlling power of an RRH according to an embodiment of the present invention.

First, a UE receives a DL signal (e.g., a DL control signal, reference signal, discovery signal, etc.) from a switched-off RRH, and measures the strength of the received DL signal. In this case, the DL signal may be configured using an RRH ID for identifying the RRH. If there is a common BBU connected to one or more RRHs, the DL signal may be configured using a BBU ID indicating the common BBU. In addition, if an RRH supporting the multi-RAT is in the switched-off state, the DL signal may be transmitted through one of RATs supported by the RRH.

If the strength of a DL signal received by a UE is greater than or equal to a predefined threshold, the UE may transmit a measurement report message to a serving BBU through a serving RRH thereof. The measurement report message may indicate that the measured strength of the signal from a specific RRH is greater than or equal to the threshold, and may indicate, for example, measurement report event 3A. Alternatively, the UE may periodically measure the strength of the received DL signal according to a predefined periodicity. In this case, the UE may periodically transmit, to the serving BBU, a measurement report message for periodic reporting of a measurement result via the serving RRH.

When the BBU receives the report message from the UE (S310), the BBU acquires RAT information supported by the switched-off RRH (S320). The RAT information may refer to information about types of one or more RATs supported by the RRH and may be managed by a specific server, entity, or Access GateWay (A-GW).

The BBU transmits an RRH information request message for acquiring RAT information about the RRH to the aforementioned server, entity, or A-GW. The RRH information request message may include, but is not limited to, a field of at least one of "message type, RRH ID, requested information about an RRH (e.g., information about a multi-RAT supported by the RRH, frequency information about the RRH, the number of antennas of the RRH, the number of antenna chains of the RRH, etc.), BBU ID and/or server/entity/A-GW IP". The BBU may request RAT information about one or more RRHs via the RRH information request message.

Upon receiving the RRH information request message, the server/entity/A-GW transmits, to the BBU, an RRH information response message containing the information requested by the BBU. The RRH information response message may include a field of at least one of "message type, RRH ID, RRH information requested by the BBU, BBU ID and/or server/entity/A-GW IP". The BBU may receive the RRH information response message via an interface defined between the BBU and the entity/server/A-GW. The interface may be an X2 interface or an X2 like interface.

In contrast with the embodiment described above, the PD may try to make a request for RAT information to an RRH related to the measurement report message in step S320. That is, the BBU may transmit an RRH information request message to an RRH sensed by the UE and receive an RRH information response message from the RRH. In this embodiment, the BBU may request and acquire the RAT information via an interface predefined between the BBU and the RRH.

The BBU having acquired the RAT information about the RRH checks the power status of the RRH (S330). That is, the BBU may check if the RRH is in the switched-on state or in the switched-off state. When the BBU transmits the RAT information to the UE, the UE may not recognize the power status of the RRH. Accordingly, the BBU may check the power status of the RRH before a specific UE activates/changes connection to the RRH.

The BBU may make a request for status information about the RRH to a server/entity/A-GW managing the status of the RRH. The BBU may transmit an RRH status request message to check the status of the RRH. The RRH status request message may include a field of at least one of "message type, RRH ID, serving BBU ID and/or server/entity/A-GW IP". The server/entity/A-GW receiving the request message may transmit an RRH status response message containing status information about the RRH requested by the BBU. Thereby, the BBU may recognize that the power status of the RRH is the switched-on/off state, and recognize if a procedure of waking up the RRH is needed.

Alternatively, the BBU may directly make a request for the power status of an RRH to the RRH whose power status is to be checked. That is, if the server/entity/A-GW does not manage status information about the RRH, the BBU may deliver an RRH status request message to the RRH via the server/entity/A-GW to check the power status of the RRH. In addition, the BBU may directly exchange an RRH status request/response message with the RRH without assistance from the server/entity/A-GW.

The BBU having acquired the RAT information about the switched-off RRH transmits the RAT information to the UE (S340). The BBU generates a DL signal for announcing the RAT information about the switched-off RRH and transmits the same to the UE via the switched-on/off RRH. The BBU may use a Primary Synchronization Signal (PSS)/Secondary Synchronization Signal (SSS)/Common or Cell specific Reference Signal (CRS), an R-CRS in NCT (New Carrier Type), or a new discovery signal as the DL signal to transmit the RAT information. The DL signal containing the RAT information about the RRH may be transmitted to the UE through a multi-RAT or single-RAT. Transmitting the DL signal through the single-RAT is more efficient than transmission through the multi-RAT in terms of power consumption.

The DL signal transmitted from the BBU to the UE may contain various kinds of information about the RRH. For example, the DL signal may contain at least one of information about a multi-RAT supported by the RRH, frequency information supported by the RRH and information about the number of antennas of the RRH information about the number of antenna chains of the RRH as the RAT information.

Further, the DL signal transmitted from the BBU to the UE may contain power status information about the RRH checked by the BBU in step S330. That is, the DL signal may contain a switched-on/off indicator. Alternatively, different DL signals may be designed and transmitted to the UE depending on whether the BBU is in the switched-on state or the switched-off state. Thereby, the UE may recognize the power status of the RRH along with the RAT information about the RRH through the DL signal received from the BBU.

The BBU may configure the DL signal for transmitting the RAT information in various forms in step S340. For example, the DL signal may contain the RAT information in the form of a bitmap, and may use predefined bits. In addition, the BBU may announce the Absolute Radio-Frequency Channel Number (ARFCN) of a frequency or a carrier supported by the RRH via the DL signal. Embodiments of configuration of the DL signal will be described later with reference to FIGS. 7 and 8.

The UE having received the RAT information in step S340 may recognize the information about the RAT supported by the RRH. Subsequently, the UE may request that the serving BBU wake up the switched-off RRH, and the BBU may receive a corresponding wake-up request message (S350).

The UE may transmit, through the wake-up request message, information about an RAT which the UE prefers among the RATs supported by the RRH and the RRH ID to the BBU. Alternatively, the UE may add information about an RAT supportable by the UE from among the RATs supported by the RRH to the wake-up request message and transmit the message to the BBU.

The serving BBU receiving the wake-up request message from the UE needs to know a BBU connected to the switched-off RRH. Accordingly, the serving BBU checks the mapping relationship between the switched-off RRH and the BBU (S360). The serving BBU of the UE may transmit a mapping table request message for checking a BBU-RRH mapping relationship to the server/entity/A-GW. The mapping table request message may include a field of at least one of "message type, RRH ID, RRH frequency, serving BBU ID and/or server/entity/A-GW IP".

Upon receiving the mapping table request message, the server/entity/A-GW may signal the ID of a BBU connected to the switched-off RRH to the serving BBU. This information may be transmitted to the serving. BBU through a mapping table response message. The mapping table response message may include a field of at least one of "a message type, RRH ID, RRH frequency, mapped BBU ID, serving BBU ID and/or server/entity/A-GW IP". Upon receiving the information about the mapping relationship, the serving BBU may recognize a BBU with which the serving BBU should coordinate the procedure of switching on the switched-off RRH and configuring an RAT.

Subsequently, the BBU changes the power status of the switched-off RRH to the switched-on state (S370). The BBU may switch on the RRH and configure an RAT of the RRH. Thereby, the UE may be connected to the switched-on RRH and communicate with the RRH. Meanwhile, operations performed for the BBU to switch on the RRH may be implemented in different sequential orders and forms, and are specifically illustrated in FIG. 9.

Figure 4:
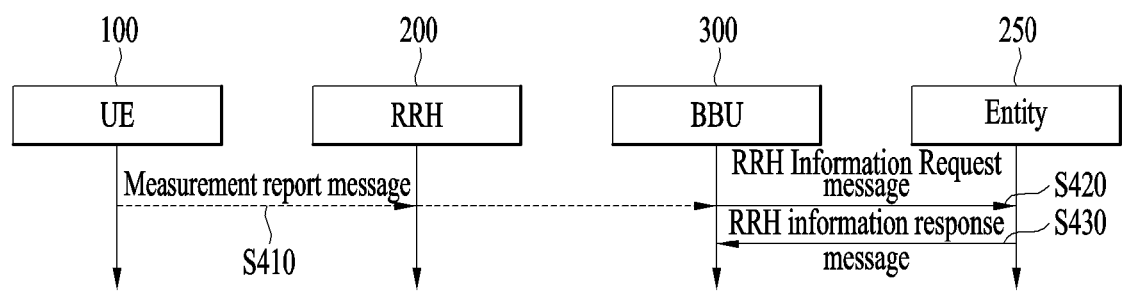
FIG. 4 is a flowchart illustrating a method for acquiring RRH information according to an embodiment of the present invention.

FIG. 4 is a flowchart illustrating a method for acquiring RRH information according to an embodiment of the present invention.

As illustrated in FIG. 3, a BBU 300 receives, from a UE 100, a measurement report message indicating that a DL signal having a strength greater than or equal to a threshold is received from an RRH 200 (S410). Subsequently, the BBU 300 transmits an RRH information request message to an entity 250 managing RAT information about the RRH 200 (S420). The BBU 300 receives an RRH information response message from the entity 250 in response to the RRH information request message (S430). Thereby, the BBU 300 may acquire the information about the RAT supported by the RRH 200 reported by the UE 100.

Figure 5:
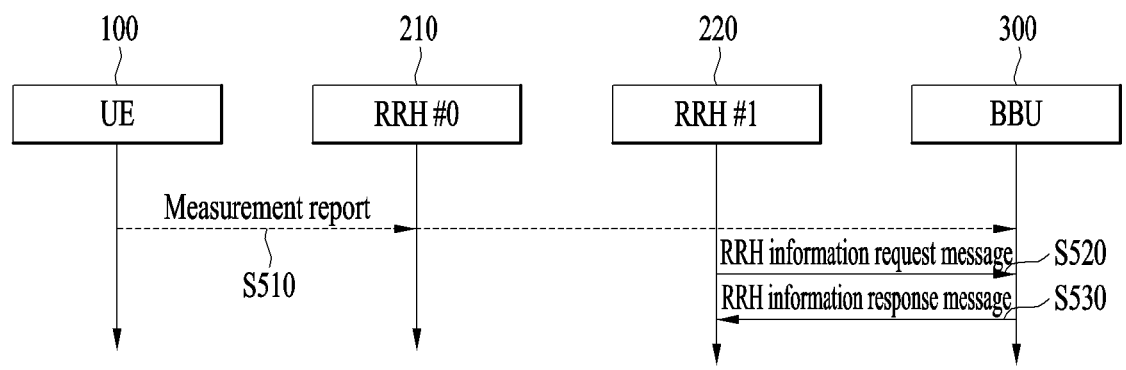
FIG. 5 is a flowchart illustrating a method for acquiring RRH information according to another embodiment of the present invention.

FIG. 5 is a flowchart illustrating a method for acquiring RRH information according to another embodiment of the present invention.

In the embodiment of FIG. 5, the BBU 300 directly makes a request for the RAT information to the RRH, in contrast with the embodiment of FIG. 4. First, the BBU 300 receives a measurement report message about RRH #1 220 from the UE 100 via RRH #0 210, which is a serving RRH (S510). Upon receiving the measurement report message, the BBU 300 directly makes a request for the RAT information to RRH #1 220 rather than to the server/entity/A-GW. That is, the BBU 300 transmits an RRH information request message to RRH #1 220 (S520), and receives an RRH information response message from RRH #1 220 (S530).

FIG. 6 is a flowchart illustrating a method for checking an RRH status according to an embodiment of the present invention.

First, BBU #0 310, which is a serving BBU of the UE 100, receives the measurement report message about RRH #1 220 from the UE 100 (S610). Upon receiving the measurement report message via RRH #0 210, which is the serving RRH, BBU #0 310 may check the information about the power status of RRH #1 220. If RRH #1 220 supports multi-RAT, BBU #0 310 may acquire information about the power status of each RAT supported by RRH #1 220 from the UE 100.

In the example denoted by A, BBU #0 310 may make a request for the power status (i.e., the switched-on or switched-off state) of RRH #1 220 to the server/entity/A-GW 250. That is, BBU #0 310 transmits an RRH status request message about RRH #1 220 to the server/entity/A-GW 250 (S620), and receives an RRH status response message in response (S630). Thereby, BBU #0 310 may recognize whether RRH #1 220 is in the switched-on state or the switched-off state.

In the example denoted by B, BBU #0 310 may make a request for the power status to RRH #1 220 via the server/entity/A-GW 250. That is, if the server/entity/A-GW 250 does not manage the power statuses of RRHs, the server/entity/A-GW 250 relays the RRH status request message to RRH #1 220 upon receiving the message (S640, S650). Subsequently, RRH #1 220 transmits an RRH status response message to the server/entity/A-GW 250 (S660), and then the RRH status response message is forwarded to BBU #0 310 (S670).

In contrast with the illustrated example, BBU #0 310 may directly make a request for the power status to RRH #1 220. That is, BBU #0 310 may transmit an RRH status request message to RRH #1 220 and receive an RRH status response message, thereby recognizing whether RRH #1 220 is in the switched-on state or the switched-off state.

The procedure of a BBU acquiring information about an RRH and the procedure of the BBU checking the power status of the RRH have been described separately for simplicity. This is simply illustrative. The procedure of the BBU acquiring information about an RRH and the procedure of checking the power status of the RRH may be simultaneously performed through a single procedure.

FIGS. 7 and 8 are flowcharts illustrating methods for transmitting RAT information about an RRH according to embodiments of the present invention.

After receiving the measurement report message from the UE and checking the power status of the RRH, the serving BBU transmits RAT information supported by the RRH to the UE. As described above, the DL signal used for the BBU to transmit the RAT information may be configured in various forms.

According to the example illustrated in FIG. 7(a), the BBU may configure information about multi-RAT or multi-carrier supported by the switched-off RRH in the form of a bitmap, and then generate and transmit a DL signal. The BBU may generate a DL signal by pre-defining a field related to each multi-RAT (or multi-carrier). For example, the BBU may set the bit of a field corresponding to an RAT (or carrier) supportable by the RRH to '1', and set the bit of a field corresponding to an RAT (or carrier) which is not supportable by the RRH to '0'. As shown in FIG. 7(a), by configuring the DL signal, the BBU may announce that the switched-off RRH supports LTE and Wi-Fi but does not support HSPA.

In the example illustrated in FIG. 7(b), the BBU may configure frequency bands corresponding to E-UTRA operating bands with a bitmap. The BBU may transmit a DL signal containing a bitmap of FIG. 7(b), thereby signaling whether or not the frequency bands implemented as in the form of a 3GPP TS 36.101 table shown in FIG. 8 are supported by the RRH.

According to another embodiment, the BBU may configure a DL signal by generating information about a multi-RAT or multi-carrier supported by the switched-off RRH using bits indicating the RAT (or carrier). For example, the bits indicating the respective RATs (or carriers) may be predefined as {LTE:0x0000, 1-ISPA:0x0001, Wi-Fi: 0x0010, . . . }. The BBU may transmit the RAT information about the RRH through the DL signal containing the pre-defined bits.

The BBU may configure a new DL signal using bits indicating the RAT information BBU about the RRH and bits indicating the RRH ID of the RRH. Alternatively, the BBU may signal the RAT information about the RRH by adding a new field to MIB (Master Information Block) or SIB (System Information Block) of the conventionally used DL signal.

According to another embodiment, the BBU may signal the ARFCN (Absolute Radio-Frequency Channel Number) values of multi-carriers supported by the RRH. That is, BBU may signal ARFCN-ValueEUTRA values corresponding to the information about multi-carriers supportable by the RRH. For example, the deal signal containing the carrier information supported by the RRH may be configured as {carrier #0: ARFCN-ValueEUTRA, carrier #1: ARFCN-ValueEUTRA, . . . }.

Figure 9A:
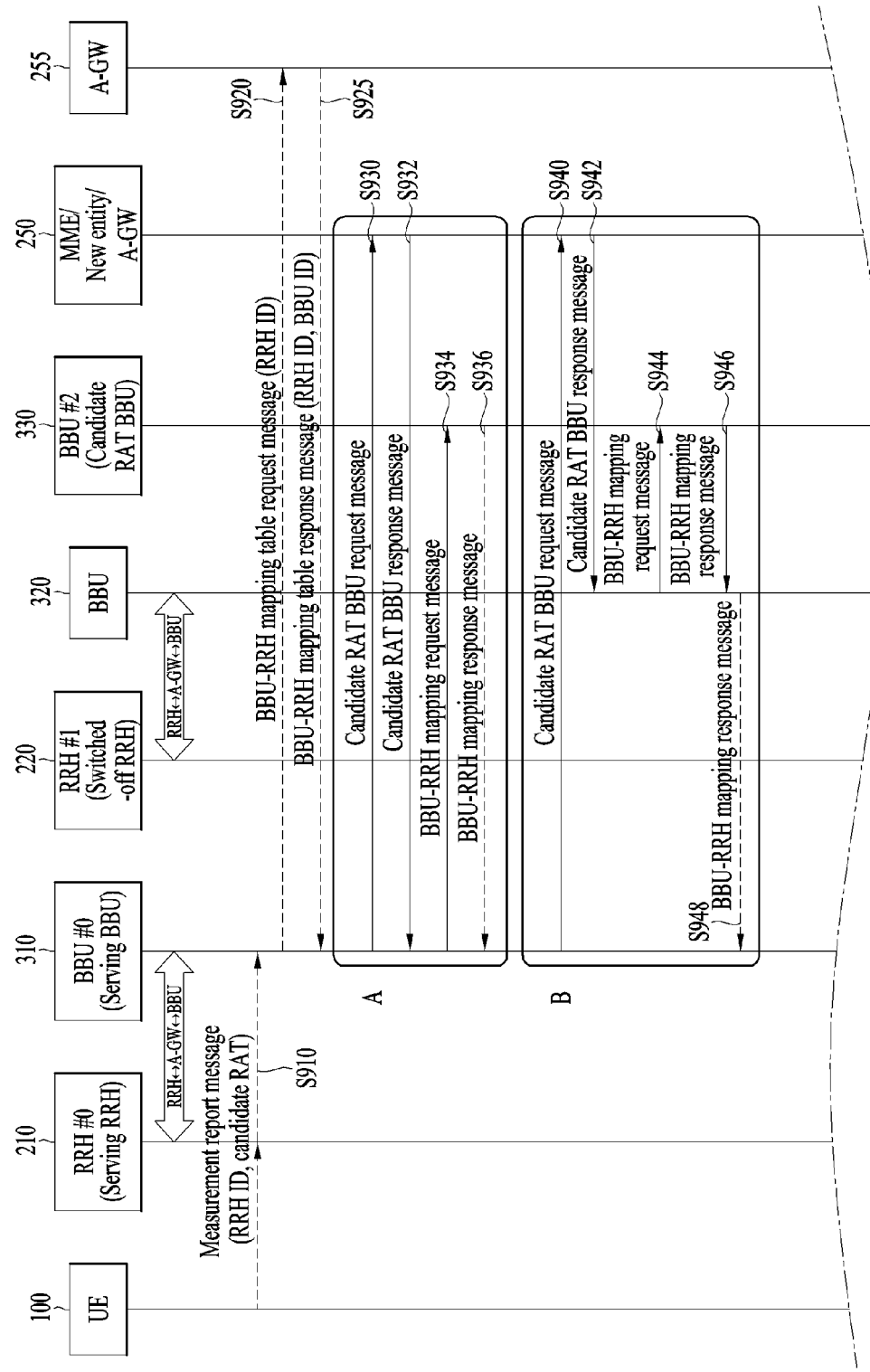
FIG. 9 is a flowchart illustrating a method for controlling power of an RRH and a method for configuring an RAT according to an embodiment of the present invention.
Figure 9B:
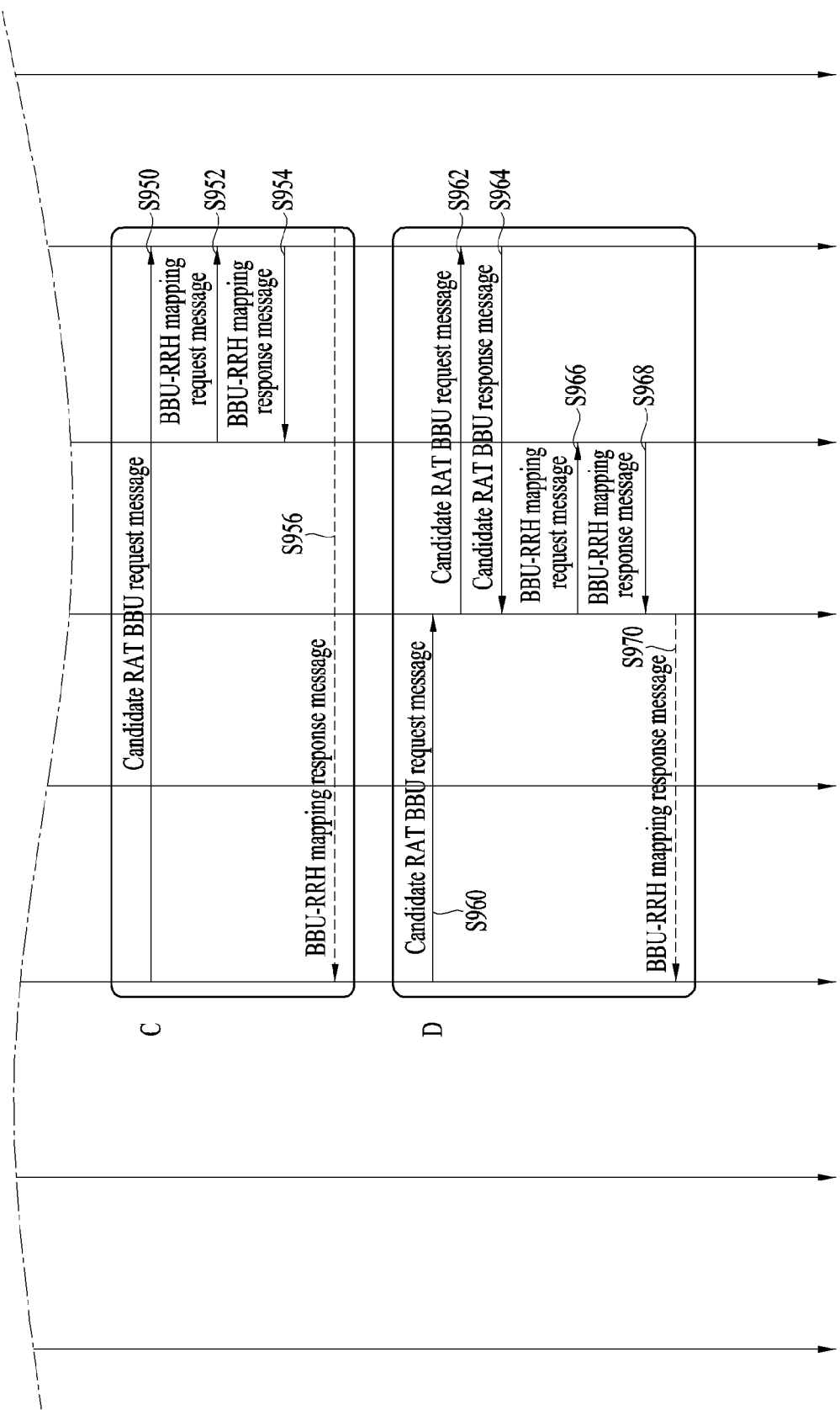

FIG. 9 is a flowchart illustrating a method for controlling power of an RRH and a method for configuring an RAT according to an embodiment of the present invention. As illustrated in FIG. 3, the BBU may switch on the RRH and configure an RAT using various methods. In FIG. 9, detailed description of elements illustrated in FIG. 3 will be given below.

In the embodiment illustrated in FIG. 9, the UE 100 communicates with BBU #0 310, which is a serving BBU, via RRH #0 210, which is a serving RRH. RRH #1 220 connected to BBU #1 320 supports multi-RAT and is in the switched-of the state. RRH #1 220 transmits a DL signal having a strength greater than or equal to a threshold to the UE 100. Hereinafter, a description will be given of a procedure in which BBU #0 310 having received a measurement report message from the UE 100 switches on RRH #1 220 and configures an RAT supported by RRH #1 220 via BBU #2 330. Although BBU #0 310, BBU #1 320 and BBU #2 330 are illustrated as being different from each other for simplicity, they may be the same BBU.

The UE 100 communicating with BBU #0 310 senses a DL signal of switched-off RRH #1 220 and transmits a measurement report signal to BBU #0 310 via RRH #0 210 (S910). BBU #0 310 performs the operations from S320 to S350 illustrated in FIG. 3, which are illustrated in FIG. 9 for simplicity of description. BBU #0 310 having received a wake-up request message transmits, to the A-GW 255, a mapping table request message for checking a BBU map to RRH #1 220 (S920). Upon receiving a mapping table response message from the A-GW 255, BBU #0 310 may recognize that BBU #1 320 is mapped to RRH #1 220 (S925).

An example denoted by A will be described first. BBU #0 310 transmits a Candidate RAT BBU request message to a server/entity/A-GW/MME 250 which manages information about BBUs (S930). As the wake-up request message received from the UE 100 contains information about RATs supported and preferred by the UE 100, BBU #0 310 requests information about a BBU capable of supporting an RAT requested by the UE 100.

The Candidate RAT BBU request message may include a field of at least one of "message type, an RAT preferred by the UE (candidate RAT), C-RNTI of the UE, serving BBU ID and/or server/entity/A-GW/MME (GUMMEI, MMEI, MMEGI, MMEC, etc.) ID". The Candidate RAT BBU request message may be transmitted via an S1 interface or S1 like interface between BBU #0 310 and the server/entity/A-GW/MME 250.

Upon receiving the Candidate RAT BBU request message, the server/entity/A-GW/MME 250 selects a BBU supporting the RAT as requested by BBU #0 310, and transmits a Candidate RAT BBU response message to BBU #0 310 (S932). The Candidate RAT BBU response message may include a field of at least one of "message type, ID of a BBU supporting the candidate RAT, server/entity/A-GW/MME ID and/or serving BBU ID".

BBU #0 310 transmits a BBU-RRH mapping request message to BBU #2 330, which is a BBU designated through the Candidate RAT BBU response message (S934). The BBU-RRH mapping request message may include a field of at least one of "message type, RRH ID, serving BBU ID and/or ID of a BBU supporting the candidate RAT" and be transmitted via the X2 interface.

Upon receiving the BBU-RRH mapping request message, BBU #2 330 may recognize that a request for connection to RRH #1 220 has been received from BBU #0 310. If BBU #2 330 determines to connect to RRH #1 220, BBU #2 330 transmits a BBU-RRH mapping response message to BBU #0 310 to announce that connection to RRH #1 220 will be executed (S936). The BBU-RRH mapping response message may include a field of at least one of "message type, RRH ID, serving BBU ID and/or ID of a BBU supporting the candidate RAT".

Upon receiving the BBU-RRH mapping response message, BBU #0 310 may recognize that the power status of RRH #1 220 sensed by the UE 100 will change to the switched-on state and that RRH #1 220 will be connected to BBU #2 330, which is a BBU supporting the RAT requested by the UE 100.

Next, an example denoted by B will be described. BBU #0 310 transmits a Candidate RAT BBU request message to the server/entity/A-GW/MME 250 which manages information about BBUs (S940). In this embodiment, the Candidate RAT BBU request message may include a field of at least one of "message type, an RAT preferred by the UE (candidate RAT), C-RNTI of the UE, serving BBU ID and/or server/entity/A-GW/MME (GUMMEI, MMEI, MMEGI, MMEC, etc.) ID, ID of a BBU connected to the switched-off RRH and/or switched-off RRH ID".

Upon receiving the Candidate RAT BBU request message, the server/entity/A-GW/MME 250 selects a BBU supporting the RAT (BBU #2 330) as requested by BBU #0 310, and transmits a Candidate RAT BBU response message to BBU #1 320 mapped to RRH #1 220 (S942). The Candidate RAT BBU response message may include a field of at least one of "a message type, ID of a BBU supporting the candidate RAT, serving BBU ID, server/entity/A-GW/MME ID, ID of a BBU connected to the switched-off RRH and/or switched-off RRH ID".

Upon receiving the Candidate RAT BBU response message, BBU #1 320 communicates with BBU #2 330 such that BBU #2 330 supporting the RAT requested by the UE 100 can establish a mapping relationship with RRH #1 220. That is, BBU #1 320 transmits a BBU-RRH mapping request message to BBU #2 330 (S944). The BBU-RRH mapping request message may include a field of at least one of "message type, RRH ID, serving BBU ID, ID of a BBU supporting the candidate RAT and/or ID of a BBU connected to the switched-off RRH".

If BBU #2 330 determines to connect to RRH #1 220, BBU #2 330 transmits a BBU-RRH mapping response message to BBU #1 320 (S946). The BBU-RRH mapping response message may include a field of at least one of "message type, RRH ID, serving BBU ID, ID of a BBU supporting the candidate RAT and/or ID of a BBU connected to the switched-off RRH".

Upon receiving the BBU-RRH mapping response message, BBU #1 320 forwards the BBU-RRH mapping response message to BBU #0 310, which is the serving BBU of the UE 100 (S948). BBU #0 310 receiving the BBU-RRH mapping response message may recognize that the power status of RRH #1 220 sensed by the UE 100 will change to the switched-on state and that RRH #1 220 will be connected to BBU #2 330, which is a BBU supporting the RAT requested by the UE 100.

Next, an example denoted by C will be described. BBU #0 310 transmits a Candidate RAT BBU request message to the server/entity/A-GW/MME 250 which manages information about BBUs (S950). In this embodiment, the Candidate RAT BBU request message may include a field of at least one of "message type, an RAT preferred by the UE (candidate RAT), C-RNTI of the UE, serving BBU ID and/or server/entity/A-GW/MME (GUMMEI, MMEI, MMEGI, MMEC, etc.) ID, ID of a BBU connected to the switched-off RRH and/or switched-off RRH ID".

Upon receiving the Candidate RAT BBU request message, the server/entity/A-GW/MME 250 selects a BBU supporting the RAT (BBU #2) as requested by BBU #0 310 BBU(BBU #2). Subsequently, the server/entity/A-GW/ MME 250 directly transmits a BBU-RRH mapping request message to the selected BBU #2 330 (S952). In this embodiment, the BBU-RRH mapping request message may include a field of at least one of "a message type, ID of a BBU supporting the candidate RAT, server/entity/A-GW/MME ID, switched-off RRH ID and/or serving BBU ID".

If BBU #2 330 receives the BBU-RRH mapping request message and determines to connect to RRH #1 220, BBU #2 330 transmits a BBU-RRH mapping response message to the server/entity/A-GW/MME 250 (S954). The BBU-RRH mapping response message may include a field of at least one of "message type, switched-off RRH ID, serving BBU ID, ID of a BBU supporting the candidate RAT and/or server/entity/A-GW/MME ID".

Upon receiving the BBU-RRH mapping response message, the server/entity/A-GW/MME 250 forwards the BBU-RRH mapping response message to BBU #0 310 (S956). Thereby, BBU #0 310 may recognize that the power status of RRH #1 220 sensed by the UE 100 will change to the switched-on state and that RRH #1 220 will be connected to BBU #2 330, which is a BBU supporting the RAT requested by the UE 100.

Lastly, an example denoted by D will be described. If the UE 100 receives a DL signal from switched-off RRH #1 220, RRH #0 210, which is the serving RRH of the UE 100, and RRH #1 220 may be adjacent to each other. Accordingly, BBU #0 310 mapped to RRH #0 210 may pre-recognize the information about RRH #1 220. Further, BBU #0 310 may also be aware of information about BBU #1 320 mapped to RRH #1 220. Such information may be acquired through a procedure of collecting information about RRHs neighboring RRH #0 210 or may be acquired from the information transmitted by RRH #1 220.

In this example, BBU #0 310 transmits a Candidate RAT BBU request message to BBU #1 320 connected to switched-off RRH #1 220 (S960). In this example, the Candidate RAT BBU request message may include a field of at least one of "a message type, an RAT preferred by the UE (candidate RAT), C-RNTI of the UE, serving BBU ID, ID of a BBU connected to the switched-off RRH, switched-off RRH ID and/or server/entity/A-GW/MME ID".

BBU #1 320 forwards the received Candidate RAT BBU request message to the server/entity/A-GW/MME 250 which manages information about BBUs (S962).

Upon receiving the Candidate RAT BBU request message, the server/entity/A-GW/MME 250 selects a BBU supporting the RAT (BBU #2 330) as requested by BBU #0 310, and transmits a Candidate RAT BBU response message to BBU #1 320 mapped to RRH #1 220 (S964). The Candidate RAT BBU response message may include a field of at least one of "a message type, ID of a BBU supporting the candidate RAT, server/entity/A-GW/MME ID, ID of a BBU connected to the switched-off RRH and/or switched-off RRH ID".

Upon receiving the Candidate RAT BBU response message, BBU #1 320 transmits a BBU-RRH mapping request message to BBU #2 330 such that RRH #1 220 and BBU #2 330 can establish a mapping relationship (S966). BBU #2 330 transmits a BBU-RRH mapping response message to BBU #1 320 in response (S968). The BBU-RRH mapping response message may include a field of at least one of "message type, RRH ID, serving BBU ID, ID of a BBU supporting the candidate RAT and/or ID of a BBU connected to the switched-off RRH".

Upon receiving the BBU-RRH mapping response message, BBU #1 320 may recognize that RRH #1 220 will be mapped to BBU #2 330, and forward the BBU-RRH mapping response message to BBU #0 310 (S970). Thereby, BBU #0 310 may recognize that the power status of RRH #1 220 sensed by the UE 100 will change to the switched-on state and that RRH #1 220 will be connected to BBU #2 330, which is a BBU supporting the RAT requested by the UE 100.

According to the embodiment described above, the serving BBU may switch on the switched-off RRH to change the power status to the switched-on state and configure an RAT of the RRH. The aforementioned procedure may also be implemented as a procedure of connecting the RAT for a specific switched-on RRH to another RAT.

Figure 10:
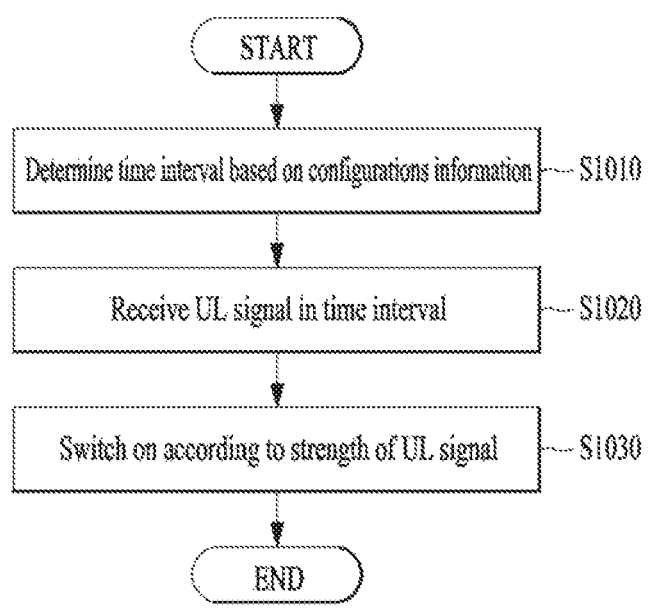
FIG. 10 is a flowchart illustrating a method for controlling power of an RRH according to another embodiment of the present invention.

FIG. 10 is a flowchart illustrating a method for controlling power of an RRH according to another embodiment of the present invention. Hereinafter, a description will be given of a method for switching on the RRH based on a UL signal.

In order for a switched-off RRH to change the power status to the switched-on state based on a UL signal from the UE, the switched-off RRH needs to continuously monitor the US signal of the UE. In this case, reduction of power consumption, which is one of the purposes of maintaining the RRH in the switched-off state, cannot be achieved, and accordingly the switched-off RRH may predefine an interval for receiving a UL signal of the UE.

Meanwhile, the RRH may change to the switched-on state (namely, may be switched on) based on a Sounding Reference Signal (SRS) or a Physical Random Access CHannel (PRACH) signal among UL signals of the UE. If the SRS/PRACH signal is used as a signal for switching on the RRH, the RRH acquires SRS/PRACH configuration information (e.g., an SRS period, SRS resources, PRACH resources, etc.) about the UE from BBUs mapped to neighboring RRHs before entering the switched-off state. The RRH may determine a time interval for receiving a UL signal of the UE based on the received SRS/PRACH configuration information (S1010).

Subsequently, the RRH wakes up and receives a UL signal in the determined time interval (S1020). If the UL signal satisfies a trigger condition (e.g., if the strength of the UL signal is greater than or equal to a threshold), the RRH may change the power status thereof to the switched-on state (S1030).

In contrast with the illustrated embodiment, a time interval for receiving a UL signal from the UE may be determined by an object other than the RRH. For example, a BBU or A-GW connected to the switched-off RRH may determine the time interval for receiving the UL signal.

In this embodiment, the BBU/A-GW may transmit a UL signal information request message to BBUs connected to RRHs neighboring the RRH entering the switched-off state. The UL signal information request message may include a field of at least one of "a message type, type of the UL signal (SRS/PRACH), neighboring RRH ID, RRH frequency, ID of a BBU connected to the neighboring RRH, IP of a subject (BBU, A-GW, etc.) to determine switch on/off and/or switched-off RRH ID".

The BBUs receiving the UL signal information request message may collect SRS/PRACH configuration information about the neighboring RRH and transmit the information to the BBU/A-GW using a UL signal information response message. The UL signal information response message may include a field of at least one of "a message type, type of the UL signal, configuration values (period, resources, etc.) of the UL signal, neighboring RRH ID, RRH frequency, ID of a BBU connected to the neighboring RRH, IP of a subject to determine switch on/off (BBU, A-GW) and/or switched-off RRH ID".

The BBU/A-GW receiving the UL signal information response message determines a time interval in which an RRH entering the switched-off state should wake up and receive a UL signal. Subsequently, the BBU/A-GW may transmit information about the time interval to the RRH entering the switched-off state. The RRH receiving information about the time interval may wake up and receive a UL signal of the UE only in this time interval.

The aforementioned time interval may be defined similar to a DTX (Discontinuous Transmission) time, which is defined such that a UE in the idle mode receives a signal of an eNB, and may be defined as a DRX (Discontinuous Reception) time in view of the RRH.

4. Method for Managing Power of RRH (Switch Off)

Figure 11:
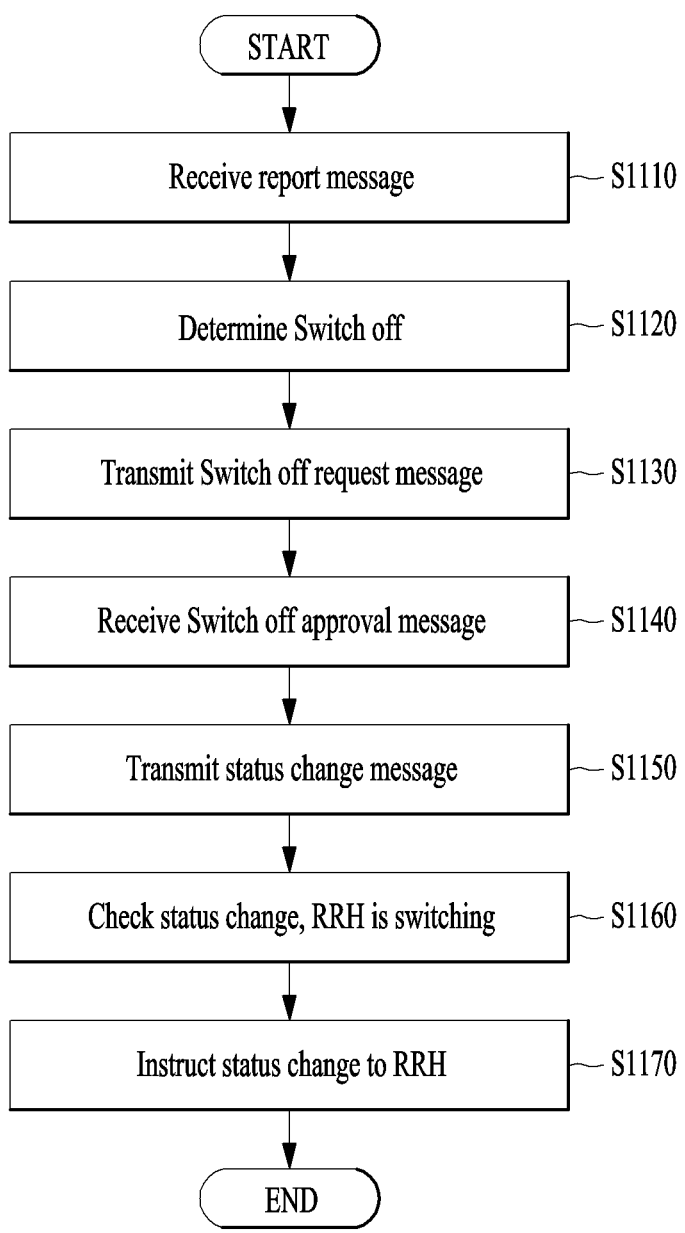
FIG. 11 is a flowchart illustrating a method for controlling power of an RRH according to another embodiment of the present invention.

FIG. 11 is a flowchart illustrating a method for controlling power of an RRH according to another embodiment of the present invention. Whether to switch off an RRH may be determined by the RRH, a BBU, an A-GW, or the like. In the embodiment illustrated FIG. 11, the BBU determines whether to switch off the RRH.

If the RRH is mapped to one or more BBUs, the BBUs needed to perform the coordination procedure therebetween as the RRH is switched off. In the coordination procedure, the BBUs may recognize existence of other BBUs mapped to the RRH and information about BBU IDs of other BBUs.

First, the serving BBU receives a measurement report message from the UE through the RRH (S1110). The BBU may acquire information about the frequency/amount of transmission and reception of signals to and from the RRH, load to the RRH, interference applied to other RRHs by the RRH, and the like from the measurement report message.

The serving BBU checks if a switch off trigger condition for the RRH is satisfied, using various kinds of information contained in the measurement report message. If the trigger condition is satisfied, the serving BBU determines to switch off the RRH (S1120). For example, the BBU may determine that the switch off trigger condition is satisfied in various cases such as a case where no signal is transmitted and received between the RRH and the UE, a case where the RRH applies interference to another RRH, the case where the RRH is subjected to interference and a case where load to the RRH is low.

Once the serving BBU determines to switch off the RRH, the serving BBU transmits a switch off request message to other BBUs connected to the RRH (S1130). Subsequently, the serving BBU receives a Switch off approval message from other BBUs in response to the switch off request message (S1140). If Switch off approval messages are received from all the other BBUs, the serving BBU transmits a status change message to the other BBUs to change the power status of the RRH to the switched-off state (S1150). If the serving BBU receives status change confirm messages from other BBUs in response, the serving BBU switches to another RRH and establishes a new BBU-RRH mapping relationship (S1160). As all BBUs connected to the RRH including the serving BBU establish a new connection relationship, the serving BBU finally instructs change of the status to the RRH (S1170). Thereby, the RRH may enter the switched-off state.

Figure 12:
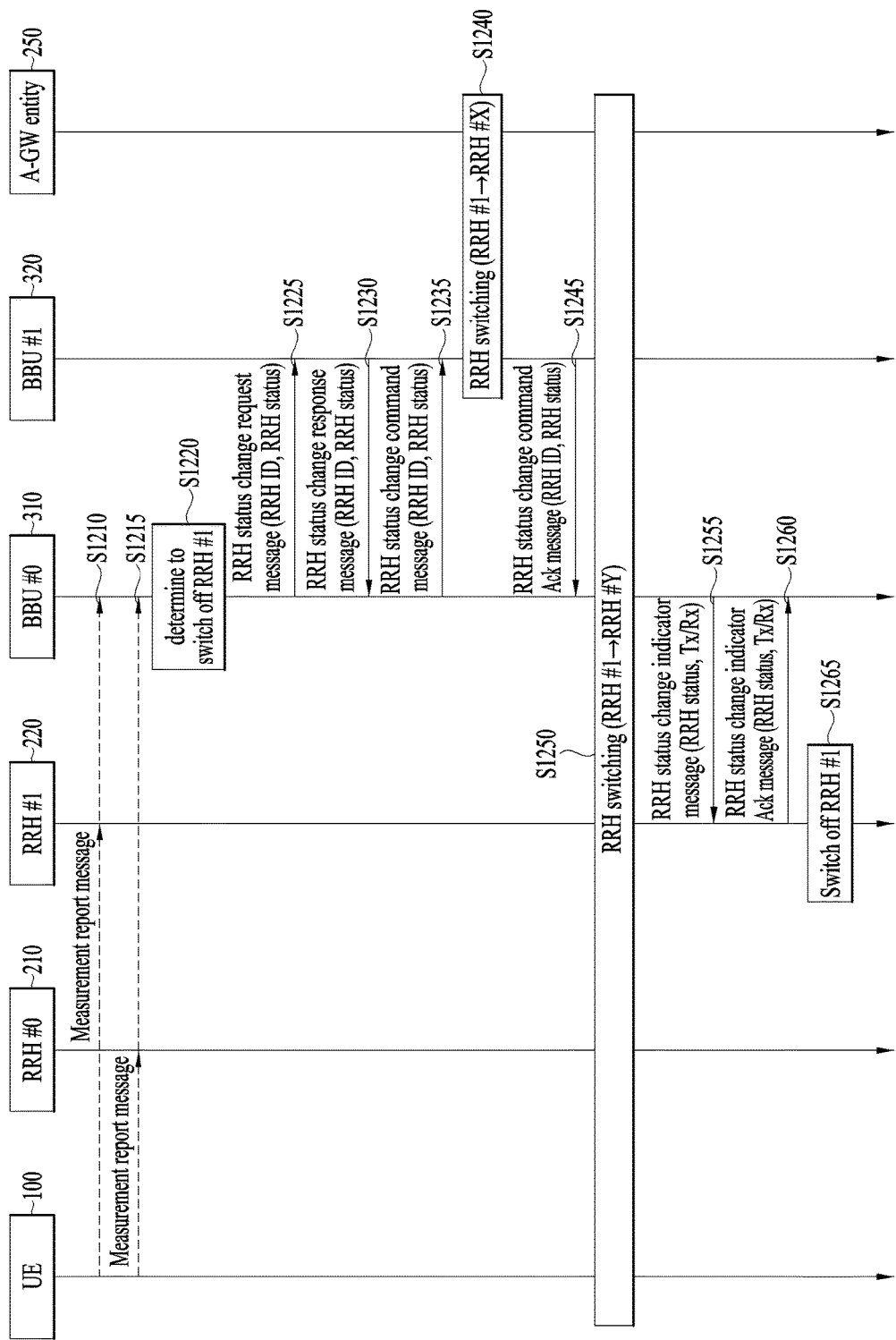
FIG. 12 is a flowchart illustrating a method for controlling power of an RRH by the RRH according to another embodiment of the present invention.

FIG. 12 is a flowchart illustrating a method for controlling power of an RRH by the RRH according to another embodiment of the present invention.

In the embodiment illustrated in FIG. 12, BBU #0 310 is connected to RRH #0 210 and RRH #1 220. The UE 100 transmits a measurement report message about RRH #0 210 and RRH #1 220 (S1210, S1215). Upon receiving the measurement report message from the UE 100, BBU #0 310, which is the serving BBU, analyzes various kinds of information about RRH #0 210 and RRH #1 220 and checks if the switch off trigger condition is satisfied. BBU #0 310 determines to switch off RRH #1 220 if the number of the signals transmitted and received to and from RRH #1 220 is small, load to RRH #1 220 is low, or interference applied by or to RRH #1 220 is strong (S1220).

BBU #0 310 may announce, to BBUs connected to RRH #1 220, that it has determined to switch off RRH #1 220. In this case, information about the BBUs connected to RRH #1 220 may be acquired from the A-GW entity 250. For example, BBU #1 320 transmits an RRH status change request message to BBU #1 320, which is another BBU connected to RRH #1 220 (S1225). The RRH status change request message may include a field of at least one of "a message type, source BBU ID, destination BBU ID, RRH ID to switch off and/or power status of the RRH to change (Switch off)".

Upon receiving the RRH status change request message, BBU #1 320 may confirm, to BBU #0 310, that RRH #1 220 will be switched off. That is, BBU #1 320 may approve switching off of RRH #1 220 if the number of the UEs 100 which are performing communication via RRH #1 220 is small or if communication can be performed via an RRH other than RRH #1 220. To approve switching off of RRH #1 220, BBU #1 320 may transmit an RRH status change response message to BBU #0 310 (S1230). The RRH status change response message may include a field of at least one of "a message type, source BBU ID, destination BBU ID, RRH ID to switch off and/or power status of the RRH to change".

If a message indicating that the power status of RRH #1 220 cannot be changed is received from any BBU, BBU #0 310 may stop switching off of RRH #1 220. For example, if an RRH status change failure message is received from a specific BBU, BBU #0 310 may recognize that the specific BBU needs to maintain connection with RRH #1 220, and stop switching off of RRH #1 220. The RRH status change failure message may include a field of at least one of "message type, source BBU ID, destination BBU ID, RRH ID to switch off and/or RRH status change failure reason".

On the other hand, if BBU #0 310 receives RRH status change response messages from all BBUs (including BBU #1 320) connected to RRH #1 220, BBU #0 310 may change the power status of RRH #1 220. BBU #0 310 transmits an RRH status change command message to all BBUs connected to RRH #1 220 (S1235). The RRH status change command message may include a field of at least one of "a message type, source BBU ID, destination BBU ID, RRH ID to switch off and/or power status of the RRH to change (to Switch off)".

The BBUs receiving the RRH status change command message performs RRH switching from transmitting bearers or flows via an RRH other than RRH #1 220 previously used to transmit the bearers or flows. The BBUs may perform RRH switching to the same RRH or different RRHs, and bearers/flows previously transmitted via one RRH may be switched to different RRHs. In FIG. 12, BBU #1 320 switches to RRH #X in place of RRH #1 220 via the server/entity/A-GW 250 managing the BBU-RRH mapping relationship (S1240). This RRH switching procedure may be performed together with a procedure of adjusting the transmit power of RRH #X to enable new RRH #X to cover the coverage of the previous RRH #1 220.

After completing RRH switching, BBU #1 320 transmits an RRH status change command Ack message to BBU #0 310 (S1245). The RRH status change command Ack message may include a field of at least one of "a message type, source BBU ID, destination BBU ID, ID of an RRH to switch off and/or the requested power status of the RRH (Switch off)".

Upon receiving RRH status change command Ack messages from all BBUs connected to RRH #1 220, BBU #0 310 may recognize that all the BBUs have completed RRH switching. Subsequently, BBU #0 310 performs an RRH switching procedure for transmitting bearers/flows via an RRH other than RRH #1 220 previously used to transmit the bearers/flows. In FIG. 12, BBU #0 310 switches to new RRH #Y (S1250).

After completing the RRH switching procedure, BBU #0 310 transmits an RRH status change indicator message to RRH #1 220 (S1255). The RRH status change indicator message may indicate which of the transmission and the reception mode of RRH #1 220 should be switched off, or indicate whether to switch off operations of some of specific carriers or specific RATs. That is, BBU #0 310 may change the power status of RRH #1 220 to the switched-on state or to the switched-off state for only some operations, thereby specifically dynamically manipulating the power status compared to the conventional operation of small cell on/off. The RRH status change indicator message may include a field of at least one of "message type, source BBU ID, destination RRH ID, RRH status (on/off) and/or status change modules (transmission, reception, carrier, RAT, etc.)".

Upon receiving the RRH status change indicator message, RRH #1 220 transmits an RRH status change indicator Ack message to BBU #0 310 (S1260). Subsequently, RRH #1 220 may change the power status of a part or entirety of modules to the switched-off state according to the request from BBU #0 310 (S1265). As described above, even if RRH #1 220 is in the switched-off state, RRH #1 220 may be connected to a specific BBU (a reserved BBU or a common BBU) to transmit a DL signal or receive a UL signal. The specific BBU may maintain a mapping relationship with the RRH and be defined for each RRH. In the illustrated embodiment, when BBU #0 310 connected to RRH #1 220 performs RRH switching to RRH #Y, BBU #0 310 may maintain connection to RRH #1 220.

The server/entity/A-GW 250 managing the RRH-BBU relationship may update the status of the RRH (to the switched-off state) and may also update the changed mapping relationship between the BBU and the RRH.

Figure 13:
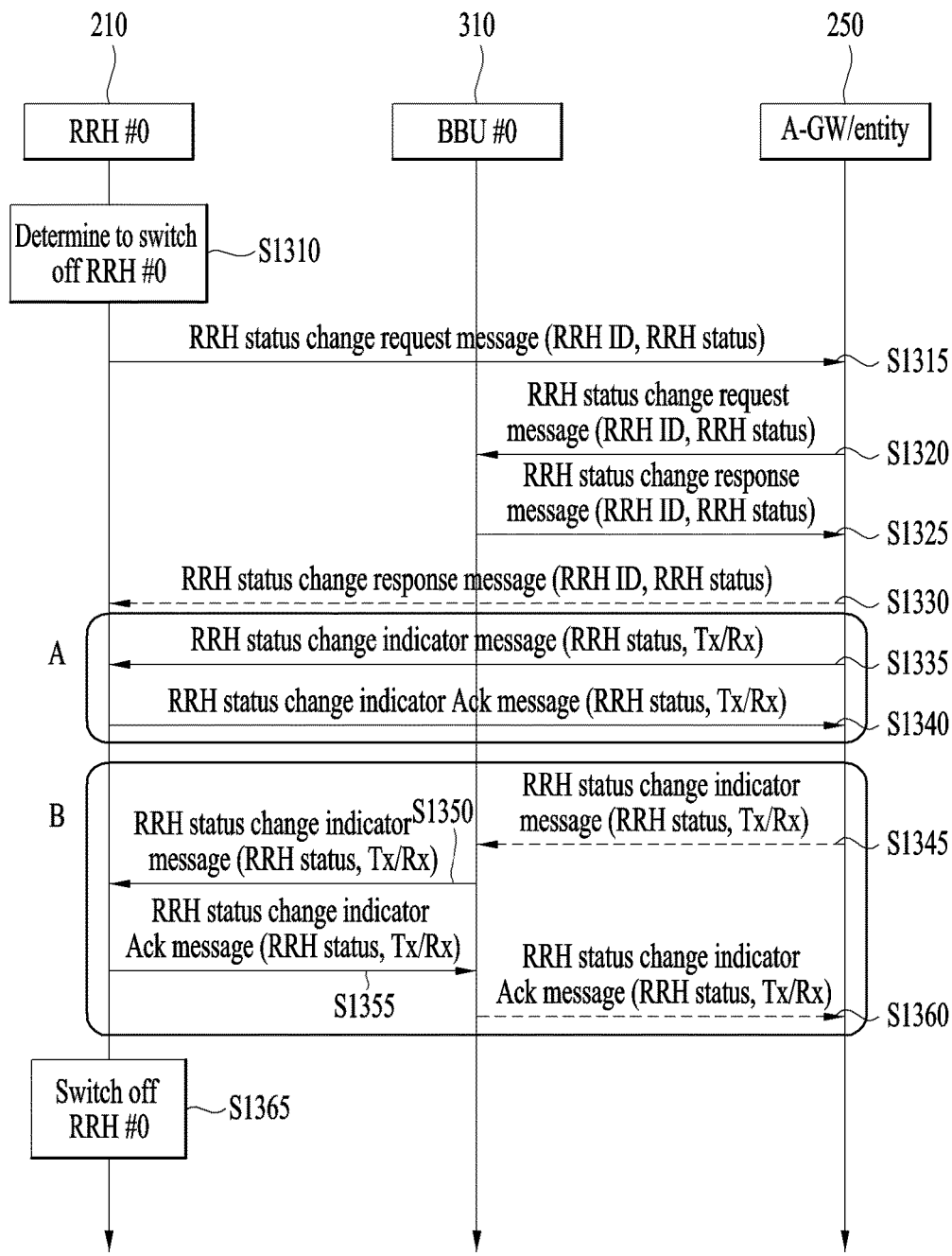
FIG. 13 is a flowchart illustrating a method for controlling power of an RRH by a BBU according to another embodiment of the present invention.

FIG. 13 is a flowchart illustrating a method for controlling power of an RRH by a BBU according to another embodiment of the present invention.

In the embodiment illustrated in FIG. 13, RRH #0 210 is connected to BBU #0 310. RRH #0 210 may determine to switch off the power thereof if there is no signal transmitted or received via RRH #0 210 for a certain time, or there is no BBU connected to RRH #0 210 (S1310).

If RRH #0 210 determines to switch off the power thereof, RRH #0 210 transmits an RRH status change request message to the server/entity/A-GW 250 managing the mapping relationship between RRHs and BBUs (S1315). The RRH status change request message may include a field of at least one of "message type, ID of source RRH to switch off, RRH status to change (Switch off) and/or IP of the server/entity/A-GW".

Upon receiving the RRH status change request message, the server/entity/A-GW 250 forwards the RRH status change request message to BBU #0 310, which is a BBU connected to RRH #0 210 (S1320). The RRH status change request message related to BBU #0 310 may additionally include a field of "destination BBU ID and/or RRH common BBU indicator". The RRH status change request message may also be transmitted not only to BBU #0 310 and also to a BBU (common BBU) with which RRH #0 210 will maintain connection when RRH #0 210 is switched off. The BBU receiving the RRH common BBU indicator may recognize that the BBU is designated as a common BBU to maintain the connection relationship with the RRH when switching off of the RRH is attempted. The common BBU may be determined by the server/entity/A-GW 250 or may be predefined.

The BBU receiving the RRH status change request message determines whether to switch off RRH #0 210. If the video determines to switch off the RRH #0 210, the BBU transmits an RRH status change response message to the server/entity/A-GW 250 (S1325). The RRH status change response message may include a field of at least one of "message type, source BBU ID, RRH ID to switch off, requested power status, IP of the server/entity/A-GW and/or RRH common BBU indicator Ack".

When the server/entity/A-GW 250 receives the RRH status change response message from all BBUs, the server/entity/A-GW 250 forwards the same to RRH #0 210 (S1330). The RRH status change response message forwarded to RRH #0 210 may additionally include information about the common BBU. Subsequently, upon receiving the RRH status change response message, RRH #0 210 may recognize that all BBUs have agreed to switch RRH #0 210 off, and acquire information about the common BBU.

On the other hand, some of the BBUs may not desire to switch off the RRH. In this case, the corresponding BBU transmits an RRH status change failure message to the server/entity/A-GW 250. The RRH status change failure message may include a field of at least one of "message type, source BBU ID, server/entity/A-GW IP, RRH ID to switch off and/or RRH status change failure reason". Upon receiving the RRH status change failure message, the server/entity/A-GW 250 forwards the received a message to RRH #0 210, and stops the operation of switching off RRH #0 210.

The server/entity/A-GW 250 managing the mapping relationship between RRHs and BBUs may instruct RRH #0 210 to switch off the power using various methods.

An example denoted by A will be described first. The server/entity/A-GW 250 transmits an RRH status change indicator message to RRH #0 210 (S1335). The RRH status change indicator message may indicate which of the transmission and the reception mode of RRH #1 220 should be switched off, or indicate whether to switch off operations of some of specific carriers or specific RATs. The RRH status change indicator message may include a field of at least one of "message type, server/entity/A-GW IP, destination RRH ID, RRH status (on/off) and/or status change modules (for transmission, reception, carrier, RAT, etc.)".

Upon receiving the RRH status change indicator message, RRH #1 220 transmits an RRH status change indicator Ack message in response (S1340). Subsequently, RRH #0 210 changes the power status for some or all of the operations to the switched-off state according to the instruction in the received message (S1365).

Next, an example denoted by B will be described. The RRH status change indicator message described in S1335 may be transmitted to BBU #0 310, which is a common view of RRH #0 210, rather than directly to RRH #0 210 (S1345). Subsequently, BBU #0 310 may forward the RRH status change indicator message to RRH #0 210 (S1350).

Similarly, RRH #0 210 transmits an RRH status change indicator Ack message to BBU #0 310 (S1355), and BBU #0 310 transmits the RRH status change indicator Ack message to the server/entity/A-GW 250 (S1360). Subsequently, RRH #0 210 enters the switched-off state according to the received RRH status change indicator message (S1365).

The server/entity/A-GW 250 managing the RRH-BBU relationship may update the status of the RRH (to the switched-off state) and may also update the changed mapping relationship between the BBU and the RRH.

Figure 14:
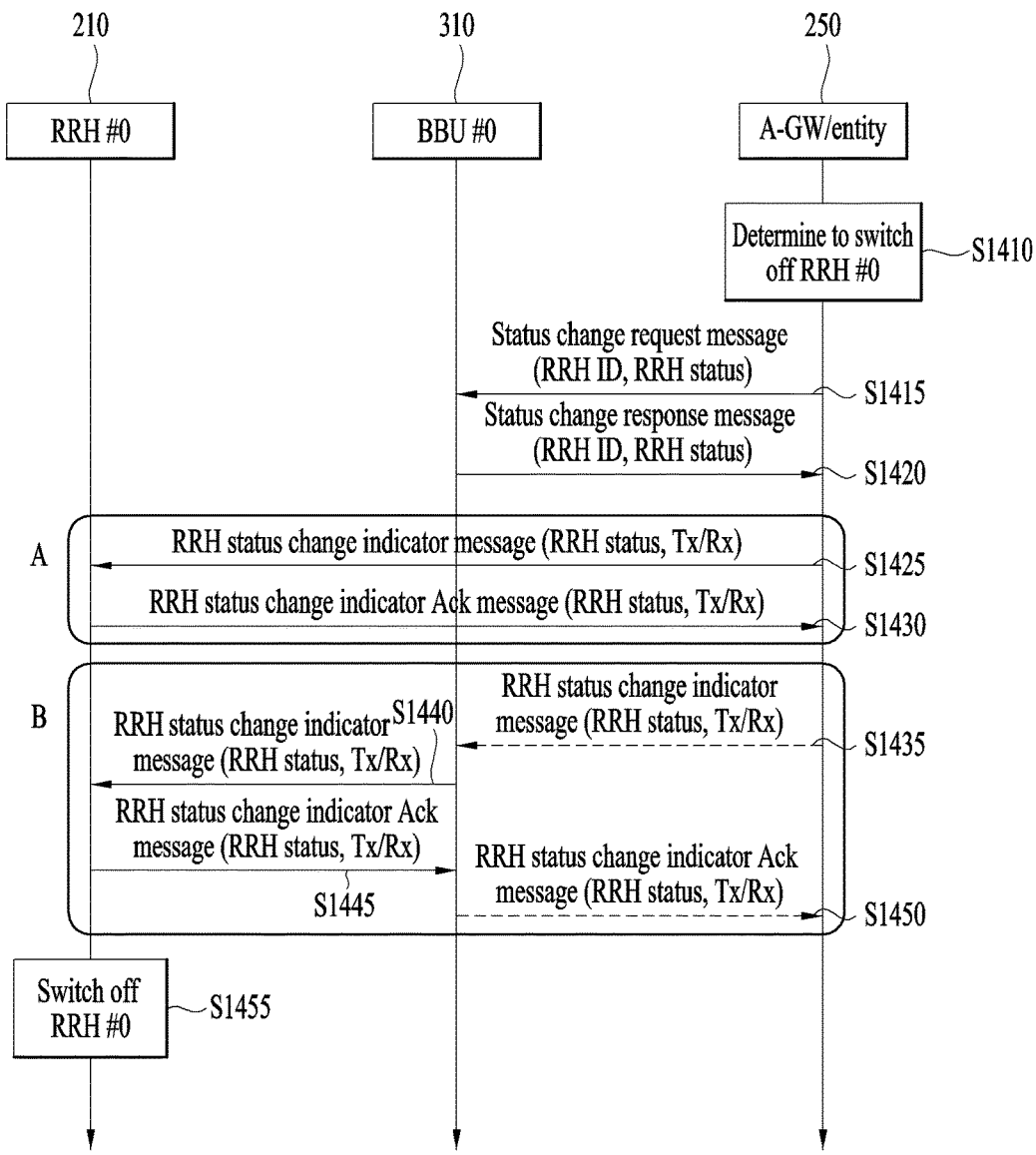
FIG. 14 is a flowchart illustrating a method for controlling power of an RRH by an A-GW according to another embodiment of the present invention.

FIG. 14 is a flowchart illustrating a method for controlling power of an RRH by an A-GW according to another embodiment of the present invention.

In the embodiment illustrated in FIG. 14, RRH #0 210 is connected to BBU #0 310. The server/entity/A-GW 250 managing the RRH-BBU relationship may determine to switch off RRH #0 210 if there is no BBU mapped to RRH #0 210 for a certain time (S1410).

The server/entity/A-GW 250 transmits, to BBUs, an RRH status change request message for requesting switching off of RRH #0 210 (S1415), and receives an RRH status change response message from the BBUs in response (S1420). This procedure may be implemented similar to the operations illustrated in FIG. 13.

If the server/entity/A-GW 250 receives RRH status change response messages from all the BBUs, the server/entity/A-GW 250 may instruct switching off of RRH #0 210. On the other hand, if the server/entity/A-GW 250 receives an RRH status change failure message from any BBU, the server/entity/A-GW 250 may instruct stopping of the procedure of switching off RRH #0 210.

In FIG. 14, a series of operations of changing RRH #0 210 to the switched-off state are shown in the parts denoted by A and B. The operations from S1425 to S1450 shown in the parts A and B may be implemented similarly or identically to the operations from S1335 to S1360 in FIG. 13. Subsequently, RRH #0 210 switches off the power of some or all of the operations and then enters the switched-off state (S1455).

5. Configuration of Apparatuses

Figure 15:
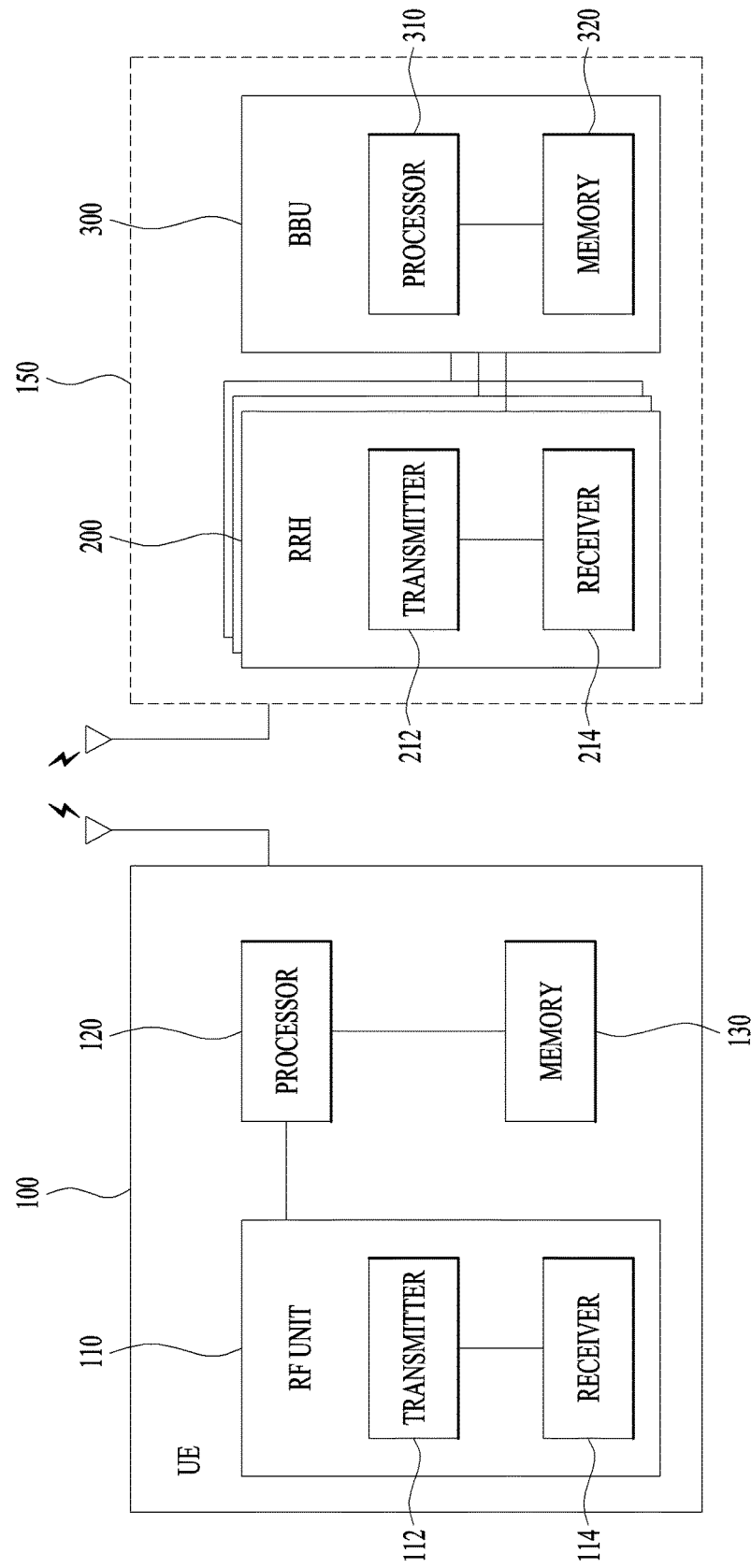
FIG. 15 is a block diagram illustrating configuration of a UE, an RRH and a BBU according to an embodiment of the present invention.

FIG. 15 is a block diagram illustrating configuration of the UE 100, the RRH 200 and the BBU 300 according to an embodiment of the present invention. While FIG. 15 illustrates a one-to-one communication environment between the UE 100 and the RRH 200, an environment in which multiple UEs and RRHs communicate with each other may also be created.

In FIG. 15, the UE 100 may include a radio frequency (RF) unit 110, a processor 120, and a memory 130. A conventional eNB 150 is implemented to include a transmitter 212, a receiver 214, a processor 310, and a memory 320. On the other hand, in a cloud RAN environment according to an embodiment of the present invention, the elements included in the eNB 150 are divided into the RRH 200 and the BBU 300.

Thereby, the RRH 200 serving as a simple antenna has only the transmitter 212 and the receiver 214. Overall communication operations including signal processing and layer processing are controlled by the processors 310 and the memory 320 included in the BBU 300. In addition, various types of connection including 1:1, 1:N, M:1 and M:N (M and N being natural numbers) may be established between the RRH 200 and the BBU 300.

The RF unit 110 included in the UE 100 may include a transmitter 112 and a receiver 114. The transmitter 112 and the receiver 114 are configured to transmit and receive signals to and from the RRH 200. The processor 120 may be functionally connected to the transmitter 112 and the receiver 114 to control a procedure in which the transmitter 112 and the receiver 114 transmit and receive signals to and from the RRH 200 and other devices. In addition, the processor 120 may apply various processing operations on a signal to be transmitted and then transmit the signal to the transmitter 112, and may process a signal received by the receiver 114.

When necessary, the processor 120 may store information contained in an exchanged message in the memory 130. The UE 100 configured as above may implement the methods of the various embodiments of the present invention described above.

The transmitter 212 and the receiver 214 of the RRH 200 are configured to transmit and receive signals to and from the UE 100. In addition, the processor 310 of the BBU 300 connected to the RRH 200 may be functionally connected to the transmitter 212 and the receiver 214 of the RRH 200 to control a procedure in which the transmitter 212 and the receiver 214 transmit and receive signals to and from other devices. In addition, the processor 310 may apply various processing operations on a signal to be transmitted and then transmit the signal to the transmitter 212, and may process a signal received by the receiver 214. When necessary, the processor 310 may store information contained in an exchanged message in the memory 320. The RRH 200 and the BBU 300 configured as above may implement the methods of the various embodiments described above.

The processors 120 and 310 of the UE 100 and the BBU 300 instruct (e.g., control, adjust, manage, and the like) operations in the UE 100, the RRH 200 and the BBU 300. The processors 120 and 310 may be connected to the corresponding memories 130 and 320 for storing program code and data. The memories 130 and 320 may be connected to the processors 120 and 310 and store an operating system, applications and general files.

The processors 120 and 310 of the present invention may be referred to as controllers, microcontrollers, microprocessors, microcomputers, or the like. The processors 120 and 310 may be implemented by hardware, firmware, software, or a combination thereof. If an embodiment of the present invention is implemented using hardware, the processors 120 and 310 may be provided with ASICs (application specific integrated circuits) or DSPs (digital signal processors), DSPDs (digital signal processing devices), PLDs (programmable logic devices), and FPGAs (field programmable gate arrays) which are configured to implement the present invention.

The methods described above may be written as programs executable in a computer and implemented in general-purpose digital computers that execute the programs using a computer readable medium. In addition, the structure of the data used in the methods described above may be recorded in a computer readable medium using various means. Program storage devices storing executable computer code for implementing the various methods of the present invention should not be understood as including temporary objects such as carrier waves and signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for controlling power of a Remote Radio Head (RRH) by a Base Band Unit (BBU) in a Cloud Radio Access Network (C-RAN) environment having the BBU and the RRH separated from each other, the method comprising:
 receiving, from a terminal, a measurement report message for reporting that a measured strength of a downlink (DL) signal of the RRH having a switched-off state is greater than or equal to a threshold,
 wherein the RRH is controlled by the BBU associated with the RRH, and
 wherein the BBU performs layer processing for the RRH;
 transmitting, to the terminal, Radio Access Technology (RAT) information indicating RATs supported by the RRH in response to the measurement report message;
 receiving, from the terminal, a wake-up request message containing information about a RAT preferred by the terminal among the RATs indicated by the RAT information; and
 setting a power status of the RRH to Switch On based on the wake-up request message.

2. The method according to claim 1, wherein the RAT information is acquired from an entity managing information about a mapping relationship between RRHs and BBUs or the RRH.

3. The method according to claim 1, further comprising:
 checking the power status of the RRH before transmitting the RAT information to the terminal,
 wherein the power status is Switch On or Switch Off, and is checked from an entity managing information about a mapping relationship between RRHs and BBUs or the RRH.

4. The method according to claim 1, wherein the RAT information expresses information about the RATs or a frequency band supported by the RRH as a bitmap, a combination of preconfigured bits for the respective RATs, or an Absolute Radio Frequency Channel Number (ARFCN) value.

5. The method according to claim 1, further comprising:
 acquiring information about a first BBU mapped to the RRH after receiving the wake-up request message,
 wherein the information about the first BBU is acquired from an entity managing information about a mapping relationship between RRHs and BBUs.

6. The method according to claim 5, further comprising:
 changing, after the acquiring, a mapping relationship between the RRH and the first BBU to a mapping relationship between the RRH and a second BBU supporting the RAT preferred by the terminal.

7. The method according to claim 6, wherein the changing comprises:
 requesting that the entity configure a BBU supporting the RAT preferred by the terminal;
 requesting that the second BBU establish connection to the RRH, based on a response for designation of the second BBU from the entity; and
 receiving, from the second BBU, a response message indicating that connection to the RRH has been established.

8. The method according to claim 6, wherein the changing comprises:
 requesting that the entity configure a BBU supporting the RAT preferred by the terminal; and
 receiving, from the first BBU, a response message indicating that connection between the second BBU and the RRH has been established when a procedure of coordination between the first BBU and the second BBU is completed according to an instruction from the entity.

9. The method according to claim 6, wherein the changing comprises:
 requesting that the entity configure a BBU supporting the RAT preferred by the terminal; and
 receiving, from the entity, a response message indicating that connection between the second BBU and the RRH has been established when a procedure of coordination between the entity and the second BBU is completed.

10. The method according to claim 6, wherein the changing comprises:
 requesting that the first BBU configure a BBU supporting the RAT preferred by the terminal; and
 receiving, from the first BBU, a response message indicating that connection between the second BBU and the RRH has been established when a procedure of coordination among the first BBU, the second BBU and the entity is completed according to a request from the first BBU.

11. A method for controlling power of a Remote Radio Head (RRH) by a Base Band Unit (BBU) in a Cloud Radio Access Network (C-RAN) environment having the BBU and the RRH separated from each other, the method comprising:
 determining to set a power status of a first RRH having a switched-on state to Switch Off based on a measurement report message about the first RRH received from a terminal;
 transmitting, to BBUs connected to the first RRH, an RRH status change request message for signaling that the power status of the first RRH should be set to Switch Off;
 transmitting, when RRH status change response messages for approving the RRH status change request are received from all the BBUs connected to the first RRH, and RRH status change command message for instructing RRH switching to the BBUs;
 performing, when RRH switching of the BBUs is completed, RRH switching for changing a mapping relationship with the first RRH to a mapping relationship with a second RRH; and
 setting the power status of the first RRH to Switch Off,
 wherein the first RRH and the second RRH are controlled by the BBU, and
 wherein the BBU performs layer processing for the first RRH and the second RRH.

12. The method according to claim 11, further comprising:
 stopping, when an RRH status change failure message for rejecting the RRH status change request is received from at least one of the BBUs connected to the first RRH, a procedure of controlling the power of the RRH.

13. The method according to claim 11, wherein the RRH status change command message comprises an indicator for designating one of the BBUs connected to the first RRH as a common BBU, wherein the common BBU is a BBU connected to the first RRH to perform communication even if the first RRH is switched off.

14. The method according to claim 11, wherein the performing of the RRH switching comprises:
   determining completion of the RRH switching as an RRH status change command acknowledgement (ACK) message is received from the BBU in response to the RRH status change command message.

15. The method according to claim 11, wherein the setting comprises:
   switching off at least one of a transmission mode and reception mode of the first RRH and switching off a part or entirety of carriers and Radio Access Technologies (RATs) supported by the first RRH.

* * * * *